(12) United States Patent
St. Martin et al.

(10) Patent No.: US 11,809,383 B2
(45) Date of Patent: Nov. 7, 2023

(54) SOCIAL IDENTITY OF OBJECTS

(71) Applicants: Raymond Francis St. Martin, Felton, CA (US); Andrew Lee Van Valer, Scotts Valley, CA (US)

(72) Inventors: Raymond Francis St. Martin, Felton, CA (US); Andrew Lee Van Valer, Scotts Valley, CA (US)

(73) Assignee: Invisible Holdings, LLC, Reno, NV (US)

( * ) Notice: Subject to any disclaimer, the term of this patent is extended or adjusted under 35 U.S.C. 154(b) by 291 days.

(21) Appl. No.: 16/787,385

(22) Filed: Feb. 11, 2020

(65) Prior Publication Data

US 2020/0174979 A1    Jun. 4, 2020

Related U.S. Application Data

(63) Continuation-in-part of application No. 15/080,028, filed on Mar. 24, 2016, now Pat. No. 10,594,831.

(60) Provisional application No. 62/138,666, filed on Mar. 26, 2015.

(51) Int. Cl.
| | |
|---|---|
| *G06F 16/188* | (2019.01) |
| *G06F 16/11* | (2019.01) |
| *G06F 16/14* | (2019.01) |
| *G06F 21/62* | (2013.01) |

(52) U.S. Cl.
CPC .......... *G06F 16/196* (2019.01); *G06F 16/122* (2019.01); *G06F 16/148* (2019.01); *G06F 21/6209* (2013.01)

(58) Field of Classification Search
CPC .... G06F 16/148; G06F 16/122; G06F 16/196; G06F 21/552; G06F 21/6209; G06Q 99/00; G06Q 50/01; H04W 4/70; H04W 4/02

See application file for complete search history.

(56) References Cited

U.S. PATENT DOCUMENTS

| | | | | |
|---|---|---|---|---|
| 5,801,067 | A * | 9/1998 | Shaw | G03B 27/521 |
| 8,050,981 | B2 * | 11/2011 | Wilson | G06Q 30/08 |
| | | | | 705/26.81 |
| 9,424,472 | B2 * | 8/2016 | So | G06F 16/58 |
| 9,448,696 | B1 * | 9/2016 | Kline | H04L 65/61 |
| 9,519,683 | B1 * | 12/2016 | Samaddar | G06F 16/9535 |
| 9,569,801 | B1 * | 2/2017 | Xu | G06Q 50/01 |
| 9,589,058 | B2 * | 3/2017 | Balduzzi | G06F 16/9554 |

(Continued)

*Primary Examiner* — Etienne P Leroux

(74) *Attorney, Agent, or Firm* — Donald R. Boys; Central Coast Patent Agency LLC

(57) ABSTRACT

A social identity system has a collection of physical objects displayed under control of a specific enterprise, a data repository storing, as a virtual object, at least a name and a description of each physical object in the collection, each virtual object associated with a unique Social Identity of Objects (SIO) code, a broad variety of digital information, entered as digital files by registered members, each instance associated with a unique SIO code, and associated by SIO codes, with physical objects in the collection. A portion of the information defined by association with one of the physical objects comprises one or more of history, stories and opinions associated by SIO codes with the members contributing, the changing collection of information over time defining an evolving social identity of the particular one of the physical objects in the collection of physical objects.

12 Claims, 10 Drawing Sheets

(56) References Cited

U.S. PATENT DOCUMENTS

| | | | | |
|---|---|---|---|---|
| 9,965,796 B2* | 5/2018 | Dhar | | G06Q 50/01 |
| 10,417,819 B2* | 9/2019 | Suomi | | G06T 17/20 |
| 10,467,237 B1* | 11/2019 | Silbermann | | G06F 16/24573 |
| 10,586,274 B2* | 3/2020 | Tapley | | G06Q 30/0641 |
| 2001/0054111 A1* | 12/2001 | Lee | | G06Q 30/02 |
| | | | | 707/999.107 |
| 2003/0135430 A1* | 7/2003 | Ibbotson | | G06F 16/30 |
| | | | | 707/E17.058 |
| 2004/0039790 A1* | 2/2004 | Lee | | G06Q 99/00 |
| | | | | 709/217 |
| 2004/0098378 A1* | 5/2004 | Kimchi | | G06F 16/22 |
| 2004/0183751 A1* | 9/2004 | Dempski | | G02B 27/017 |
| | | | | 345/8 |
| 2007/0011141 A1* | 1/2007 | Foucault | | G06F 16/4393 |
| 2008/0228636 A1* | 9/2008 | Gattis | | G06Q 30/00 |
| | | | | 705/39 |
| 2009/0003355 A1* | 1/2009 | Jain | | G06Q 30/02 |
| | | | | 370/400 |
| 2009/0089364 A1* | 4/2009 | Hamilton, II | | G06F 16/954 |
| | | | | 709/203 |
| 2009/0187476 A1* | 7/2009 | Chia | | G06Q 30/02 |
| | | | | 705/26.1 |
| 2009/0271247 A1* | 10/2009 | Karelin | | G06Q 10/10 |
| | | | | 705/40 |
| 2010/0274647 A1* | 10/2010 | Earle | | G06Q 30/0236 |
| | | | | 705/14.27 |
| 2012/0084661 A1* | 4/2012 | Gil | | G06Q 30/0251 |
| | | | | 715/738 |
| 2012/0173651 A1* | 7/2012 | Chen | | G06F 9/542 |
| | | | | 709/206 |
| 2013/0043302 A1* | 2/2013 | Powlen | | G06Q 50/01 |
| | | | | 235/494 |
| 2013/0325704 A1* | 12/2013 | Gorman | | G06Q 10/06 |
| | | | | 705/325 |
| 2014/0030688 A1* | 1/2014 | Lolli | | G06Q 10/101 |
| | | | | 434/350 |
| 2014/0117076 A1* | 5/2014 | Eberlein | | G06F 16/9566 |
| | | | | 235/375 |
| 2014/0149362 A1* | 5/2014 | Kearns | | H04L 67/06 |
| | | | | 707/691 |
| 2014/0156712 A1* | 6/2014 | Krishna | | G06F 16/122 |
| | | | | 707/822 |
| 2014/0172975 A1* | 6/2014 | Smith | | H04L 67/535 |
| | | | | 709/204 |
| 2014/0244834 A1* | 8/2014 | Guedalia | | H04W 4/08 |
| | | | | 709/224 |
| 2014/0344269 A1* | 11/2014 | Dong | | H04L 67/12 |
| | | | | 707/802 |
| 2015/0006696 A1* | 1/2015 | Hershberg | | G06F 9/451 |
| | | | | 709/223 |
| 2015/0033152 A1* | 1/2015 | Shuster | | G06F 3/0485 |
| | | | | 715/753 |
| 2015/0065175 A1* | 3/2015 | Kokubo | | H04L 67/52 |
| | | | | 455/456.3 |
| 2015/0221049 A1* | 8/2015 | Colangelo | | G06Q 30/06 |
| | | | | 705/313 |
| 2015/0248429 A1* | 9/2015 | Pregueiro | | G06F 16/9577 |
| | | | | 715/202 |
| 2016/0041870 A1* | 2/2016 | Davis | | H03M 13/373 |
| | | | | 714/773 |
| 2016/0055491 A1* | 2/2016 | Bulut | | H05B 45/20 |
| | | | | 705/7.29 |
| 2016/0156642 A1* | 6/2016 | Kouznetsov | | G06F 21/552 |
| | | | | 726/23 |
| 2016/0205097 A1* | 7/2016 | Yacoub | | H04L 61/4511 |
| | | | | 726/6 |
| 2016/0224664 A1* | 8/2016 | Noren | | G06F 16/5866 |
| 2016/0267511 A1* | 9/2016 | Bartholomew | | G06Q 30/0222 |

* cited by examiner

1

SOCIAL IDENTITY OF OBJECTS

CROSS-REFERENCE TO RELATED APPLICATIONS

The present application is a Continuation-in-Part (CIP) and claims priority to co-pending application Ser. No. 15/080,028 filed 24 Mar. 2016, which claims priority to provisional application 62/138,666 filed Mar. 26, 2015. All disclosure of the prior applications is incorporated herein at least by reference.

BACKGROUND OF THE INVENTION

1. Field of the Invention

The present invention is in the technical area of information management and pertains more specifically to apparatus and methods for creating a social identity for an object or a collection of objects, and associating that object in a comprehensive information system with specific persons and descriptive and contextual information.

2. Description of Related Art

The Internet network is well-known, and comprises a great number of network nodes, each typically coupled to specific functionality and information. There exist and are well-known as well, browser applications that enable persons through the use of computerized appliances to search for nodes according to specific search criteria, and to connect to and interact with individual nodes, including downloading of information in repositories coupled to the nodes. Applications and systems exist in the art as well for individuals to create nodes in the Internet network, commonly referred to as web sites.

A relatively new concept in the Internet network is known as the Internet of Things, referred to as IoT. In the IoT individual apparatus may be enabled as nodes in the network by implementing network communication hardware and software in such apparatus, and the apparatus and its communication subsystem may have an IP Address.

Having an IP address is not a new concept for an apparatus, as this is quite common for network capable devices like computers and routers. But in the IoT the nodes are such as automobiles, other vehicles, refrigerators, TV sets, and much more. A commonality among the "things" in the Internet of Things, is that the things are enabled to connect to the Internet network.

It has occurred to the present inventors that the node concept may be extended far beyond the IoT concept in a non-obvious way. In the IoT each apparatus or entity that is enabled as a node may be described as a noun, a refrigerator for example. An important object in the IoT is that the nodes are interactive in the Internet network. That is, one may associate all appliances in her home as IoT nodes, and may exercise considerable interaction and control throughout the population of appliances. But other than being, for example, a refrigerator or a spa filter, there is no rich contextual information and association. There is little if any motivation in the IoT to represent a book, a guitar, a settee, a stagecoach, an article of clothing, ad infinitum, as nodes in a network with specific identification. The present inventors have imagined that assigning unique ID to such objects and assemblies of objects opens a door to rich contextual association among the objects, history of the objects in association with living and formerly living people, stories about the objects and the people in association, and much more. Objects, by functionality of the system, are enhanced with personality.

In the Detailed Description of this invention below, through specific examples and embodiments, the inventors describe a new and unique system based on Social Identity of Objects.

BRIEF SUMMARY OF THE INVENTION

In one embodiment a social identity system is provided, comprising a collection of physical objects organized and displayed under control of a specific enterprise, a structured, network-connected data repository storing, as a virtual object, at least a name and a description of each physical object in the collection of physical objects, each virtual object associated with a unique Social Identity of Objects (SIO) code, a network-connected server coupled to the data repository and having a processor executing software from a non-transitory medium, the software providing interactive interfaces to registered members operating network-connected computerized appliances, each member, by registering, being automatically associated with a unique SIO code, one or more agents of the specific enterprise, authorized to interact in specific ways with the data repository, each individual agent associated with a unique SIO code, and broad variety of image, textual and audio information, entered into the data repository as digital files by the registered members operating network-connected computerized appliances, each instance of information entered associated automatically, when entered, with a unique SIO code, and associated by the member entering, by SIO codes, with individual ones of the physical objects in the collection of physical objects. A portion of the broad variety of image, textual and audio information defined by association with a particular one of the physical objects in the collection of physical objects comprises one or more of history, stories and opinions regarding the particular one of the physical objects in the collection of physical objects, the history, stories and opinions associated by SIO codes with the members contributing the history, stories and opinions, the changing collection of information over time defining an evolving social identity of the particular one of the physical objects in the collection of physical objects.

In one embodiment the one or more individual agents enter at least a name and a description of each physical object in the collection of physical objects, each physical object in the collection associated with a unique Social Identity of Objects (SIO) code on entry. Also in one embodiment names and descriptions are uploaded to the system individually or in batches. Also in one embodiment the system further comprises a search function enabling agents of the museum to search the database using a variety of search criteria. And in one embodiment search criteria comprise at least SIO codes, names of objects, categories of objects, objects by dates of entry, and identity of contributors of individual media files.

In one embodiment the system further comprises digital tools enabling agents of the museum to organize and publish collections of media files associated with individual ones of the museum objects, and to enhance the published collections with added descriptive and promotional content. Also in one embodiment the system further comprises a search function enabling registered members who are not agents of the museum to search the database using a variety of search criteria. In one embodiment the search criteria comprise at least SIO codes, names of objects, categories of objects, objects by dates of entry, and identity of contributors of individual media files. In one embodiment registered members provide a profile including contact information, and are enabled to elect to keep profile information private, or to share the information publically. In one embodiment the system further comprises a communication system whereby registered members may communicate with other registered members. And in one embodiment the communication system suggests communication between specific registered members based in part on tracked commonality of activity of registered members in the system.

In another aspect of the invention a method for providing social identity to an object is provided, comprising creating a data repository comprising virtual objects as names and descriptions of physical objects in a collection of physical objects organized and displayed under control of a specific enterprise, the names and descriptions entered by agents of the enterprise, assigning to each virtual object on entry a unique SIO code;

registering members to the system through a network-connected server coupled to the data repository and having a processor executing coded instructions from a non-transitory medium, the coded instructions enabling registration of members operating network-connected computerized platforms, each registered member creating a profile and being assigned a unique SIO code;

enabling registered members operating network-connected computerized appliances to enter a broad variety of image, textual and audio information to the data repository as digital files, each instance of information entered associated automatically, when entered, with a unique SIO code, and associated by the member entering, by SIO codes, with individual ones of the virtual objects representing physical objects, a portion of the broad variety of image, textual and audio information defined by association with a particular one of the physical objects in the collection of physical objects comprising one or more of history, stories and opinions regarding the particular one of the physical objects in the collection of physical objects, the history, stories and opinions associated by SIO codes with the members contributing the history, stories and opinions, the changing collection of information over time defining an evolving social identity of the particular one of the physical objects in the collection of physical objects.

In one embodiment of the method one or more individual agents enter the at least a name and a description of each physical object in the collection of physical objects, each physical object in the collection associated with a unique Social Identity of Objects (SIO) code on entry. In one embodiment names and descriptions are uploaded to the system individually or in batches. In one embodiment the method further comprises a search function enabling agents of the museum to search the database using a variety of search criteria. In one embodiment search criteria comprise at least SIO codes, names of objects, categories of objects, objects by dates of entry, and identity of contributors of individual media files. In one embodiment the method further comprises digital tools enabling agents of the museum to organize and publish collections of media files associated with individual ones of the museum objects, and to enhance the published collections with added descriptive and promotional content.

In one embodiment the method further comprises a search function enabling registered members who are not agents of the museum to search the database using a variety of search criteria. In one embodiment the search criteria comprise at least SIO codes, names of objects, categories of objects, objects by dates of entry, and identity of contributors of individual media files. In one embodiment registered members provide a profile including contact information, and are enabled to elect to keep profile information private, or to share the information publicly. In one embodiment the method further comprises a communication system whereby registered members may communicate with other registered members. And in one embodiment e communication system suggests communication between specific registered members based in part on tracked commonality of activity of registered members in the system.

BRIEF DESCRIPTION OF THE DRAWING FIGURES

DETAILED DESCRIPTION OF THE INVENTION

Figure 1:
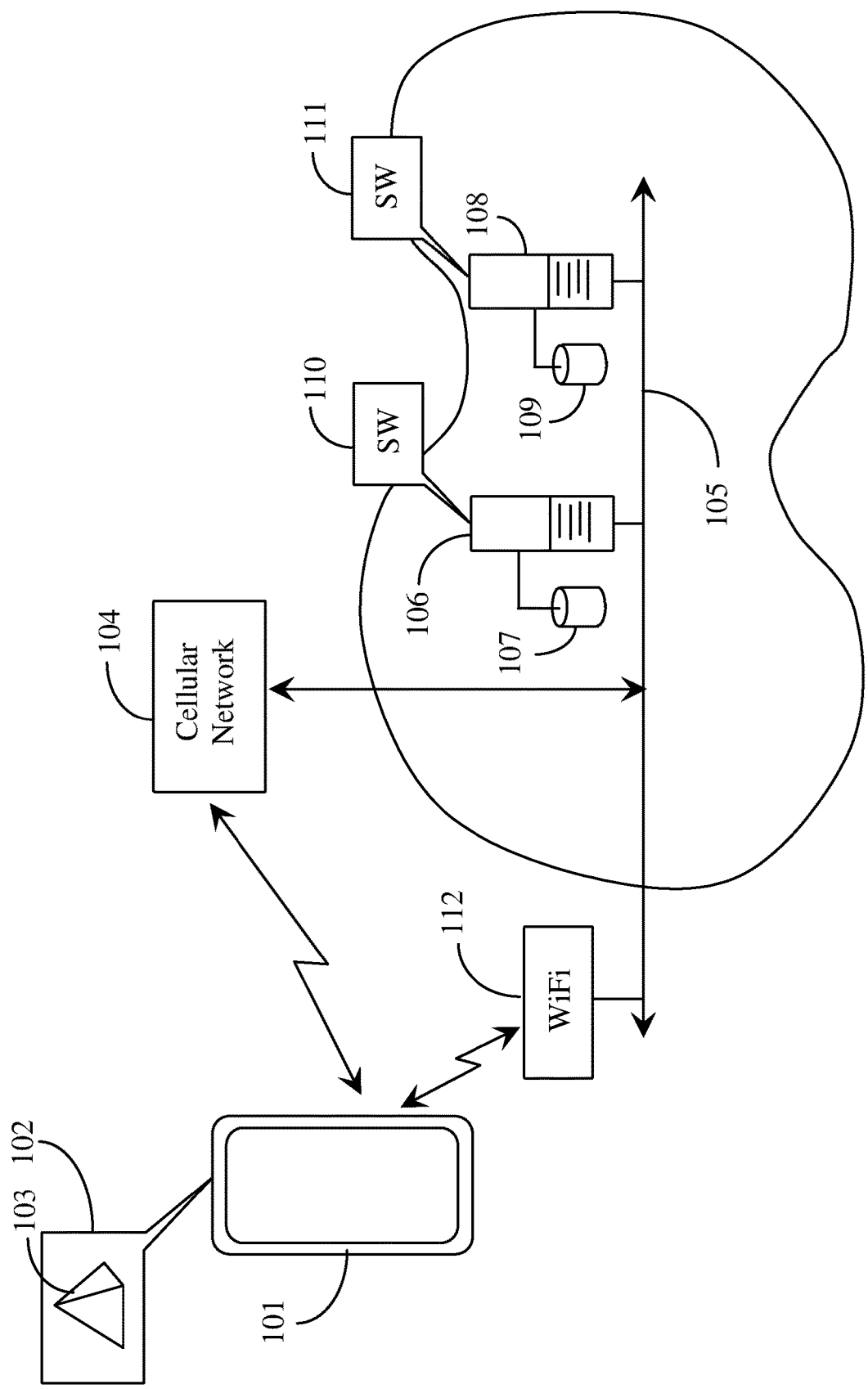
FIG. 1 is a simple architectural diagram illustrating one embodiment of the invention.

In an embodiment of the invention an object embodying some level of intrigue or importance to one or more persons is registered (instantiated) with a service of the invention, the object receiving a unique code printable or otherwise displayable on the object or on a sticker or identifier placed on, in or otherwise associated with the object being registered. As will become clear in further description below, some objects may be so very well-known that there would be no need to physically associate the object with a physical indicia of the unique code associated with the object. For example, the city of Washington, D.C. is so well-known that it would never be confused with another city, so, if the City of Washington D.C. were to be instantiated as an object in an embodiment of the invention, the city would be assigned a unique code, but it would not be necessary (nor indeed possible) to affix a sticker or other physical indicia to the city.

The code in embodiments of this invention is henceforth termed an SIO code. The SIO code may be machine-readable and may in some embodiments be captured using an imaging mechanism of a mobile telephone for example. In one embodiment the code may be used to retrieve information about the object over the Internet network, including associations with persons, with other objects, with stories, with time windows, and with a broad variety of other criteria. The code may be embodied to be transferrable in a bar code or a QR code.

In one embodiment of the invention it is important that the code be unique to the particular object with which it associated, and given the potential number of objects that might be identified in this way, the code needs to be of a nature that a very large number of different unique codes may be generated.

One way such codes may be generated and used is simply by a binary string of sufficient length. An example is the 128-bit nature of IPV6 code now used for Internet IP addresses. A 128-bit binary sequence provides $2^{128}$ unique designations. This is 340,282,366,920,938,000,000,000,000,000,000,000,000 designations. This is $2^{52}$ addresses for every observable star in the known universe, or $2^{95}$ addresses for each of the about 6.5 billion persons alive today. This is enough to assign a unique address to every atom on the surface of the Earth, with enough left over to do every atom on another 100+ planets. This should be enough.

It is not, of course, necessary that a 128-bit binary number be readable somehow from an object tagged with one such number. The bit sequence may, of course, be rendered by use of hexadecimal notation, as it is in IPV6, or in any of several other ways to be a much shorter and less complicated rendition, perhaps by scientific notation, for example, which may, upon entry of capture, be translated in any other convenient way. There are many shorthand ways of expressing large numbers, and any and all may be useful in embodiments of the invention. It is important that the code be unique and that it be associated with a single object or entity, and that it be embodied in a way that is easy to capture and/or enter into an Internet-capable device.

At this point it is important to understand that an object associated with a code in an embodiment of the invention need not be an atomic object, as in the case of the city of Washington, D.C. mentioned above. The coded object may be composed of many other objects, which may each bear or be uniquely associated with (or not) an SIO code. As a simple example, consider the Empire State Building in New York City. For that matter, consider New York City as an example, and the Empire State Building as a lower hierarchical component of New York City. One or both may be assigned an SIO code. Further, many other buildings (and streetlamps) in New York City may be tagged with an SIO code. Different floors of the Empire State Building may be uniquely tagged as well, and thousands of other objects in the Empire State Building may be uniquely tagged.

In this grand scheme of things, the skilled person will see that the SIO codes may be nested in a hierarchical scheme such that codes recorded in memory in a system of the invention may be associated hierarchically in a parallel manner to the manner that the real objects are associated in the real world. And it should be noted that the word "objects" in this sense is used in a broad context, so buildings and battleships, for example, may be objects with an SIO code, and components of the buildings and battleships may have separate unique SIO codes. It is intended in one embodiment that any object entity that has mass may be a candidate for an SIO code. In some embodiments of the invention provision is made for SIO codes assigned to virtual entities, that is, to ideas that have no mass, but are instantiable in the minds of persons who may avail themselves of services of the invention.

An example of a virtual entity might be the Angel Gabriel. The idea of the angel is not known in the annals of science to be a specific object having mass and occupying space, but is most certainly an entity that may be invested with characteristics and qualities in the minds of human beings. In an embodiment of the invention allowance is made for such entities, which may be instantiated with SIO codes, and associated with persons, belief systems, religious organizations, time windows in history, stories provided by members of a service in an embodiment of the invention, and more.

FIG. 1 is a simple architectural diagram illustrating one embodiment of the invention. An object 103 is illustrated in FIG. 1, and represents one of a very large number of objects that may be uniquely associated with (instantiated by) an SIO code in embodiments of the present invention, in the broad sense of objects as described above. A mobile communication device 101 having an image-capturing capability may be used in various embodiments, and is shown in this representation as imaging object 102 in image field 102. Mobile device 101 may be, for example, a cellular telephone, a pad device, or any other mobile, computerized device that incorporates image capture. Device 101 is enabled to connect to the Internet network, illustrated here as Internet backbone 105 representing all of the networks and sub-networks and interconnections that make up the Internet network, through either a local WiFi network 112 or through radio communication on a cellular network 104, either of which may gateway to Internet backbone 105.

Two Internet-connected servers 106 and 107, coupled respectively to data repositories 107 and 109 are shown, both executing respectively software (SW) instances 110 and 111, which provide functionality for the servers. One or both may be enabled to provide functionality and services to users as described in enabling detail below in embodiments of the present invention.

Assume for example that server 106 provides functionality for users in embodiments of the invention. Server 106 may in embodiments provide, through execution of SW 110, one or more web sites with one or more pages servable to users, who in many embodiments will be registered members of the SIO system, and will have user profiles, including history of activity with the system of the invention and with objects registered with the service.

In one embodiment a registered user may wish to socially instantiate an object in the system of the invention, which, because every object social instantiation is unique, and association is made between the object and a unique object code, as described above, may be done only once. In embodiments of the invention a formalized process is provided for object social instantiation.

Figure 2:
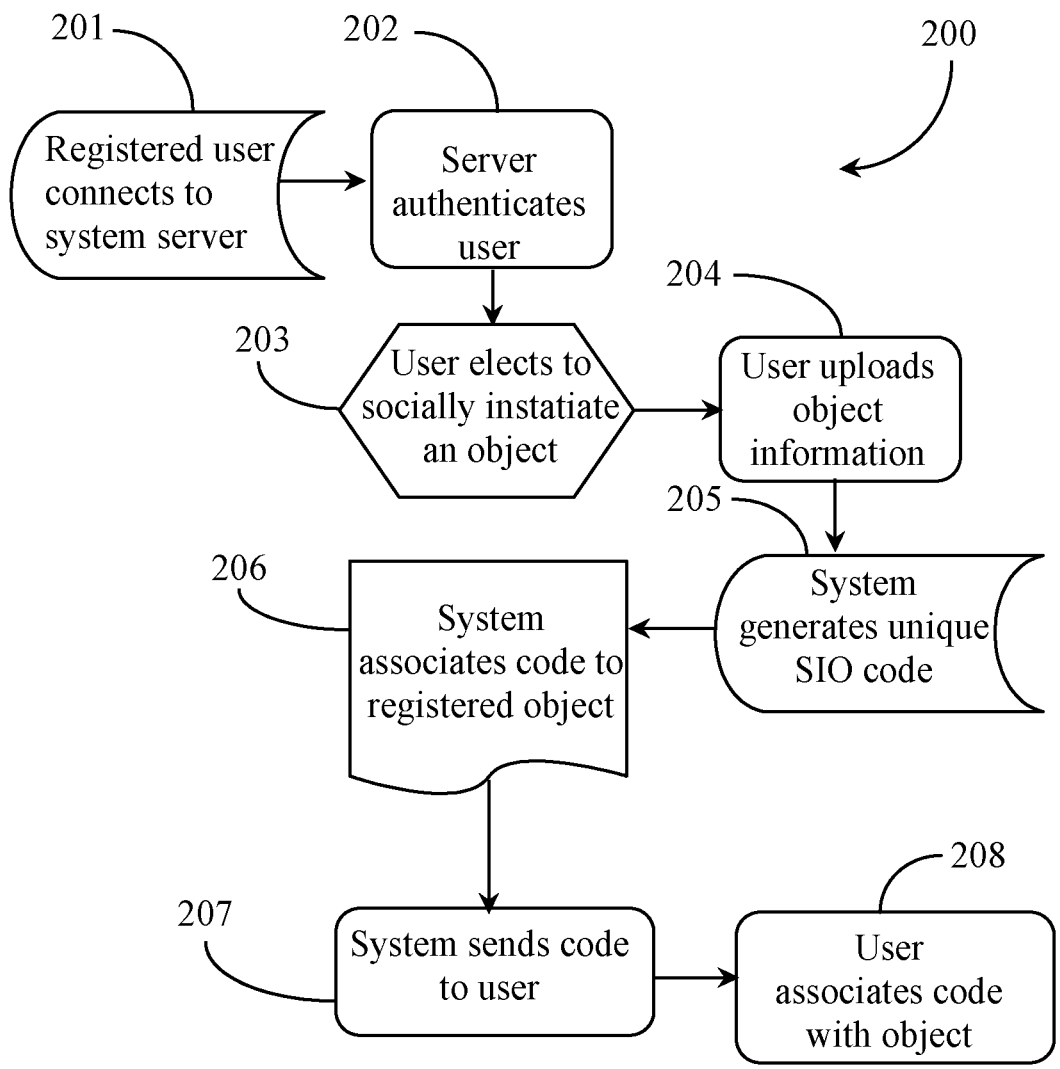
FIG. 2 is a flow chart illustrating an exemplary process for social instantiation of an object in an embodiment of the invention.

FIG. 2 is a flow chart illustrating an exemplary process for social instantiation of an object in an embodiment of the invention. At step 201 a registered user connects to system server 106. Server 106 authenticates the user through functionality provided through execution of SW 110. The server presents an interactive interface by a browser application on the user's device, which enables the user to select from a variety of activities, and in this example the user elects at step 203 to socially instantiate an object.

At step 204 the user identifies the object to be instantiated, and uploads information about the object to the server. This information may be of many sorts, and may in some instances be quite extensive. The user may photograph the object, create video of the object, and may enter any amount of textual information or recorded audio regarding the object. In one embodiment this object information, which may include extensive contextual information, such as where the object is presently, where the object has been, where how and when the object has been associated with specific persons, and so forth, is stored temporarily while the system attempts to determine whether the object in question may already be instantiated with an SIO code and related information in databases coupled to the server. It is important to understand that this uploading of information is not a one-time process. Once an object is instantiated with a social identity the instantiating user, and indeed other users, may upload more information over time at different points in time.

If the system determines to the best of information available that the object in question has not been instantiated with a social identity, the system selects a unique SIO code at step 205. This step may, in some embodiments, have other levels of intelligence. For example, objects having social identity may be, as described above, assemblies or collections of other objects. An example is a residence, which may be instantiated by a user with social identity, but will certainly comprise a considerable number of other objects, such as the roof, a fireplace the back driveway, a box in the attic, and so on. As a simplistic example, a registered user may in the illustrated process, be instantiating a carpet in her living room with a social identity, and the system may discover that the living room itself, and the residence as well already have been instantiated and have a unique SIO code. In this case immediate association will be made in a nested, hierarchical manner, between the new SIO code being assigned to the carpet, and the SIO codes of the living room and the residence. Since the address of the residence will be known in this example, because the residence is already instantiated with social identity and code, the city or town, County, State, Country, planet, and so on may also be known, and may be socially registered as well. Codes in such cases will be hierarchically nested, and in some cases, whether or not the town or state, for example actually has an SIO code.

The nesting association described immediately above will in some embodiments be accomplished by tagging. In one embodiment it is the assigned code that is tagged. One important tag in this embodiment will be object description. In step 204 described above among the items of information that a user may upload to the system at time of instantiation is a physical description of the object, which in the case of objects that are not virtual, will usually include one or more images or video sequences.

In an embodiment of the invention data structure is provided such that each SIO code assigned will have a substantial list of tags. One of these is object description. Others may be an object history, which may include a time when the object came into being (birth of the object). A chair for example will have been manufactured or made by a person. The history may be extensive. Another tag may be association with people, which may or may not be member users of the system of the invention. A very important aspect of the invention is this association of objects, characteristics of objects, history, stories about objects, and so forth, which is described in more detail below.

It will be apparent to the skilled person that some contextual information for some objects may be fluid in nature. For example, a user may register a personal aircraft, or a locomotive, for example. Location on the planet may be known at the time of registration and assigning a unique SIO code, but as time passes the location may change drastically. In some embodiments the system may have functionality for periodically or continually updating contextual information regarding many objects, such as by accessing data from other Internet-connected sites like server 108 of FIG. 1, which might be a server hosted by an airline, for example.

Once the system has generated or assigned a unique SIO code to the object in question, the system associates that code and all of the information regarding the object in a database for the purpose in repository 107, at step 206, creating an object profile. The information will in some embodiments also comprise current ownership, and a history of ownership, if any. Importantly, in many embodiments the system also associates the registering user to the object as the first to have registered that object socially. In many embodiments this affords special privileges to that user regarding that object, and may open unique controlling functionality for the user, which is described further below.

At step 207 the unique SIO code assigned is sent to the registering user. For exemplary purpose, assume that the codes assigned are 128-bit binary, as in ipV6 address notation. In this instance the code sent may be the hexadecimal notation of the 128-bit binary, which reduces each sequence of 16 bits to a sequence of four letters and/or numbers. This will be a code with a maximum of 32 characters. In other embodiments the 128-bit binary may be rendered by the system as a base-10 number, and then rendered in scientific notation as a decimal number and a factor of ten. There are a variety of different ways that the full representation of the code may be reduces to an abbreviated form that may allow transmission and use by users of codes that are more manageable than 128-bit binary.

In some embodiments registered users will be enabled through software executing on the user's computerized appliance to have a local data repository where SIO codes instantiated by that user are stored, as well as at least partial information of associations of the codes as stored in the system repositories on the server side.

In various embodiments there are a variety of ways that the system may enable users to physically affix a code to the object registered. The system may provide, for example, the SIO code as a bar code or a QR that may be printed on the object or printed on a tag or other physical identifier that may be affixed to the object. In many cases the user may store the code received from the system, and may not affix the code in any manner to the object that was registered to have social identity. Consider, for example, that a registered user is the first to instantiate the one moon of the planet Earth to the system to have a social identity. The user may receive the assigned SIO code, but may have difficulty attaching the code to the moon. Nevertheless, the system knows that there is but one moon for the planet Earth, and there should be no confusion in the matter in functions in embodiments of the invention.

It will be apparent to the skilled person that a substantial number of objects may be instantiated to the system as having a social identity, and may be assigned unique SIO codes. Information, including image, textual and audio information, as well as contextual information, may be uploaded to the system to be stored and usable regarding the objects registered. Very significantly, contextual information may also include association of registered users and other users to objects registered. That is, the original registering user may in some embodiments be associated in a high profile way to the objects that that user instantiates. But the original user may associate other users with the object, or other users may be associated by the system by functionality encoded as machine intelligence in the system. For example, in one embodiment the system associates with the Facebook™ system, perhaps through an API, and when a registered user instantiates an object, that user's first degree friends in Facebook™ may automatically be associated with the object as well. In this case there may be functionality for the friends to dis-associate if they wish. The same sort of automatic association may be made for other social network sites where individuals may have associations with others.

An important issue in embodiment of the invention is that each object instantiated as having a social identity is actually unique. That is, the same object has not been previously instantiated and assigned an SIO code. It was described above that the system, at the time of registration of an object determines to the best of its ability at the time whether the object already has been instantiated and has an SIO code. The process of ensuring unique instantiation, however, is an ongoing process, and the system may determine at some time after an object is registered that the object is, in fact, not unique, and may have been previously registered. In this ongoing process correction and adjustment may be made, with appropriate notification to members.

As a result of the substantial social instantiation of objects and association with information, including contextual information and personal association of persons and other objects, a great deal of information may be stored and cross-referenced, and made accessible to users and enterprises.

Referring once again to FIG. 1, device 101 may be a computerized device under control of a user of the system of the invention, and may be in this example any sort of computerized device having Internet access and I/O capability. Object 103 is in this example an object that has been previously registered as having a social identity, and was at the time assigned a unique SIO code. The object also has, by virtue of having been instantiated as having a social identity, associated with the object's code in the system, considerable associated image, textual and audio information, as well as rich association with other objects and persons, both registered and not registered, all of which is recorded in a dB in repository 107.

A registered user may interact with the system of the invention through functionality provided by SW 110 executing on server 106 to access, review and download stored information regarding object 103, and may upload more information regarding that object, which the system will add to the already stored and associated information. This interaction may occur in a variety of ways in various embodiments of the invention.

One mode of interaction may be through an SIO code that may be somehow affixed to object 103, and which may be imaged by the user via image-capture capability 102 of device 101. A user may focus the imaging apparatus on object 103 and capture the SIO code as a QR code, which in one embodiment will initiate connection to the Internet and to server 106, displaying an interactive interface to the user, with capability for the user to review all of the associated information of object 103, perhaps incrementally, and all of the contextual information, including association with other objects and persons who may or may not be registered users of the system.

In one use case, an instantiated object might be, for example, a museum artifact connected to previous locations and curators tracked back to discovery of the object. A connected user might be a student who discovered the object. Objects may be related in a variety of ways, such as being individual paintings of a set of paintings, or individual bone types of a dinosaur skeleton, etc. There are many, many possibilities.

In one aspect a user that owns a coded object might be interested in who owns other existing copies or originals of the same object that make up a set of the objects such as a series of painting by a same artist, or a collection of compact discs of a same musician band or composer. In one aspect, the object might be a virtual object or a copy of a real object held in seclusion or not generally available for public viewing. Members or public visitors such as member 704 may access rich information.

The information store and association for a socially instantiated object may be very rich and varied. As a single example a user may register a vintage musical instrument, a guitar, for example, once owned and used by Willie Nelson. That guitar may be associated in the data repository with a new owner of the guitar, who may be the person registering the guitar. It may also be associated with other owners, and with extensive data about Willie Nelson, relating, for example, to concerts where Willie Nelson used that guitar. Associations may also be made to similar guitars (perhaps the same make or type) owned or used by others. Intricate relationships between persons and objects and other persons and other objects, replete with stories and histories, may be made. A user might, for example, through the guitar object, find and communicate with other persons who were in attendance at a particular venue where Willie Nelson played that guitar.

As another single example an object might be a bench, a seat in a stadium, or other fixed location hosting the object in a fixed position. The code of the object in this case may provide information about actions that object has "witnessed". For a stadium seat, for example, a home run may have landed there. A dignitary might have sat there for an event.

It will be apparent to one with skill in the art that the contact brokering system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

In some embodiments of the inventions enabled in this specification the identifying mechanism may be other than an indicia or member number. In some cases electronic devices, similar to the chips used in pet identification, may be used, and a member's mobile device may be enabled to connect to the electronic chip wirelessly, or by contact, and to retrieve the unique SIO code, and use that SIO code to access data in the network, such as the website of a service according to an embodiment of the invention. In this aspect the service in an embodiment of the invention, when a new person or object is registered, may assign a unique SIO ode, and that SIO code may be encoded in an electronic device rather than printed on a decal or the like, or both. The electronic devices may be provided in many different forms that may be added to or embedded in objects.

In one embodiment of the invention an interactive interface provided by the system to a registered user may enable that user, reviewing associations of a socially instantiated object with persons, to communicate with one or more of the associated persons. In some embodiments users may be enabled to authorize or deny such communication or provision of contact information. In one embodiment a person's contact information may not be provided, but a communication may be left for the person at the network site, and the system will notify the person that there is a communication to retrieve.

Also in one embodiment there may be a service for users who own socially instantiated items to sell or trade these items with other users. This service is integrated with the communication system in that offers for sale, buy or trade may be made to other users, or in general, and may be published in a variety of ways. A potential seller may, for example, advertise an item for sale with a price and time or other terms, and instruct the offer to be made only to a subset of other registered users who may be identified by the system from profile information, for example. A transaction system, including collecting and paying money and other value may be a part of the system as well.

In one embodiment of the invention, a variation of the coding scheme allows the system to assign a window of sequential (serial) codes to an object, and the forward progression of codes in the window are to represent the object at different points in time over a period of time. The first code of the serial window identifies the object at the time the object first enters the social universe as an instantiated object. The next 365,000, for example, in the overall series are now reserved for the same object and represent the same object incremented in age from AE (after entry) in one day increments for a thousand years. Now, anytime someone references that object in the system the id is incremented by the delta-days from AE. The example, of course, is subject to bending and stressing according to need.

In some embodiments of the invention the code assigned to a socially instantiated object may be assigned and stored in the system, with all of the information and association described above, but there may be a variety of ways that that code, once transmitted to a user, may be rendered and used for identification of objects. For example, a code may be rendered as light or variations in light, and as such, may be communicated from an object to a person seeking the code for the object. Consider a case where a reflector may be attached to an object such that impinging white light may be reflected in a range and ordered sequence of wavelengths (colors). A capturing device might have a locally executed program, compatible with SW at the system site, that could process the color sequences and translate same to the SIO code in the manner stored at the system site. A QR code might also employ color.

In other embodiments sound and sound sequence may be used to tag an object, and to communicate code by the object to interested persons. In one embodiment a binary sequence may be rendered by a series of very closely spaced lines in a surface, the lines having at least some slight depth into the surface. In this scheme there is a standard separation distance, assume 1 decimeter. So two vertical lines side by side represent two binary one's side by side at that position in the sequence. If there is no adjacent line at 1 decimeter from another, then there is an intervening binary zero at the position. A binary sequence of 128 bits may then be represented by these lines lake a bar code, but in this case the code is read by dragging a wand across the line sequence in an agree-to direction, producing a sound that may be captured by a device's microphone and rendered by an app on the device back to the SIO code. So codes in or on objects do not have to be QR or bar codes, they might be light emitted or sound embodied codes that may be translated as needed to the SIO code. In sound, pitch and frequency are also usable for variation for coding and code communication.

In one embodiment of the invention a mechanism is provided in the instantiation of objects by members enabling the member to classify the new object or the associated manager of the object as Anonymous, Public or Restricted. If the member selects Anonymous as a category for the object, the nature of the object will be searched, as described above, to try to establish that the object is not redundant. The member in this particular case can attach information to the object, but the member in some circumstances might not be associated with the object. In other circumstances the member who instantiates the object might be associated with the object, but the association may be hidden from other members, or at least a sub-set of other members. In various aspects of the invention information related to an object may be completely anonymous, may be completely public, or may be restricted in a variety of ways.

If the member selects Public as a classification, the nature of the object will be searched, as described above, to try to establish that the object is not redundant. The member can categorize or identify a Public object and the member's identity will be associated with the new object. In some embodiments a member may be enabled to moderate content associated with the new object by other members.

If the member selects Restricted as a classification, the member can categorize or identify the object, the member's identity will be associated with the new object, and the member may restrict what other members may interact with the object and may view and moderate any interactions.

Figure 3:
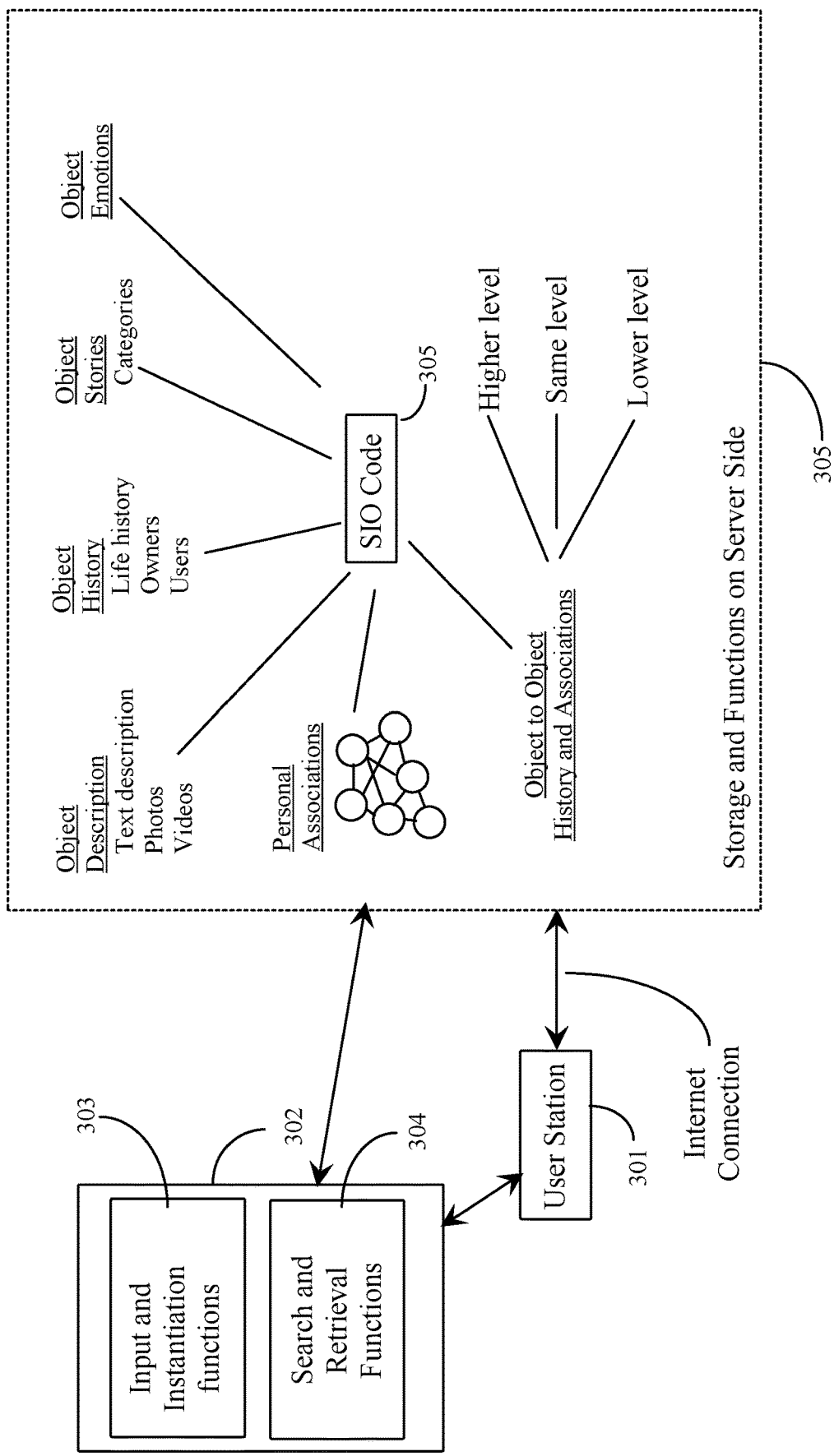
FIG. 3 is a diagram demonstrating how instantiated objects may be related (associated) in an embodiment of the invention.

FIG. 3 is a diagram demonstrating how instantiated objects may be related (associated) in an embodiment of the invention with such as people, other objects, stories and much more. A user station 301 is Internet-capable, and shown connected to an Internet-connected service 305 in an embodiment of the invention. A registered user at station 301 has interactive windows provided by software (SW) 302, which may in one alternative be executed at the user's station, as provided by service 305, or in another alternative may operate a browser application wherein services and functionality are provided from the server side through interactive pages accessible through the browser application. Functionality through SW 302 is roughly divided into two categories: Input and Instantiation functions 303 and Search and Retrieval functions 304.

As is described above, every object, virtual or physical, that is instantiated by a registered user has a unique SIO code 305. Referring back to FIG. 2, when a user instantiates an object in the system, at step 204 the user enters information about the object. At this point the information is used by the system to determine if the object already is in the system with an SIO code. But after the code is assigned, the information is categorized, stored and associated with the code. Further, after a code is assigned the same, or in some cases other users, may add to the information regarding the object.

In one embodiment at step 204 an interactive guide are provided to the user to guide the user in submitting the minimum information that allows the system to properly determine whether the object is already in the system, and to adequately describe the object at a minimum when an SIO code is assigned. The user may be prompted, for example to respond as to whether the object is physical or virtual, whether the object, if physical, is an assembly of other objects that may be in the system, or may be entered in the system. Other prompts may be provided to further categorize and describe the object. The user may be prompted, if appropriate, to provide images or videos to help describe the object. There may be a step in this process wherein the system determines that the object is, in fact an assembly of other objects in the system, or is an element in an assembly in the system as an object having an SIO code.

There may be a broad variety of types of information about objects that may be entered by users or determined by the system. As shown in FIG. 3, storage on the server side may have rich description of the object, history of the object, which may include owners and users and association with times and time windows, stories about the object, wherein the stories may be categorized as well, people associated with the object, and people associated with people associated with the object. The personal associations will in many instances be a rich matrix of threads. There may be as well object to object associations, such as described above, where an object is an element of an assembly of objects, or is itself an assembly of other elements as objects. The diagram of FIG. 3 is exemplary, and is meant to represent as association that may be far more extensive that that shown.

SW 302 in FIG. 3 is shown to include functions 303 for a user to input information, always related to an object, and to instantiate objects in the system. These input and output functions operate together in many ways. For example, a user may connect to the system to find an object in the system. The user may search for an object through entry of an SIOO code, or by keywords related to any of the categories in the system. As a single example, a user may elect to look for stories about race horses. The system might return a list of such stories much as might be returned by Google™, but from the system's data storage facilities rather than the Internet. The specificity in this list will depend on the detail of the search criteria entered by the user. There may be rich interactive guidance provided by the system to provide specificity.

Every story about a racehorse in a list that is returned will be represented simply as a title, or a few words or lines at the beginning of the story, or perhaps by a synopsis of the story. Every item in the list will be interactive for the user to go to the story and read it, or hear it recited, or watch it as a PowerPoint or as a video or movie, depending on the nature of the story as entered by a registered user, and associated with an object by an SIO code. In addition to access to the stories of the nature sought, the items in the returned list will be interactively associated with the SIO code, hence the object, to which the story is associated. This association with the object of the story may be to more than one object in a descending order of strength of association, led by the object and SIO code to which the story was originally entered. This is because a story, once entered, may be associated by the system or by a user with other objects, and also because the strongest object association may have association with other objects as well.

It may be seen, then, that there are a multitude of entry points into the associated storage at the system, and any entry may lead to a wide variety of destinations, leading to still other destinations. In this single example, the user entered the matrix of associations by seeking stories about racehorses, but a user might enter by seeking an SIO code, perhaps found physically affixed to an object, which will lead by another choice of many paths to many other sorts of information.

In one embodiment of the invention the associations, indicated by simple lines in FIG. 3, may have a range of strength, which may be by increment or by quantification in a preprogrammed range. Association strength may vary, for example between 1 and 100, either by integer, or by decimal numbers. In navigating through items of information associated with one another and with objects having SIO codes the strength of association may be one means of determining by a user where to go next after once entering the data repository through a search.

As described above, users may add information and associations to the data repository under certain circumstances. In one embodiment information entry may be closed for a particular SIO, or restricted, perhaps by the registered user that instantiates the object. In some instances the instantiating user, or another user designated as an administrator for certain SIO codes, may review and filter information added by others, and may have ability to block or to alter and edit information entered. In one embodiment there are queues for newly entered information, which may be provided to moderators for review before being released into the associated data for use by others.

One particular circumstance in which entry may be restricted is in the instance of instantiation by a user of a virtual object. This may be, for example, a fictional character or fictional object imagined (authored) by the instantiating user, and may be offered for interaction to other users only in a managed way by the instantiating user. A simple example might be a love poem authored by one user, instantiated with an SIO code, associated with other poems, works of art and people, perhaps, that the original author might open to amendment or addition by other user poets, in which the original author may be the sole judge of what addition or change might be made. One may imaging, as another example, that one user may start a fictional story with a character, and enter a first chapter, after which the story may open to other users to refine or add a character, to enter a second chapter, or a number of separate chapters, wherein a story may branch off into a wide variety of different stories by input of other users, or a single story may be jointly developed by a group of users, who may associate by agreement, and who may have discussions as to where the story may go next.

The last example opens another important point, which is that registered users in the system will typically have a user profile, perhaps with an alias and with real or hidden contact information, such that users may contact one another and interact in a wide variety of ways through the system. In some embodiments such interaction is entirely within the system of the invention through an internal text or messaging mechanism. There may also be ability by user permission, for some users to contact other users outside the mechanisms of the invention.

In a rather broad statement of the invention, in some embodiments a unique identifier, such as a mark or sequence of numbers, letters, colors, sounds, shapes and/or combination thereof that is attached to an inanimate object (physical or metaphysical) and used to humanize it as a digital social being and or digitally connect to other objects or people. This includes an object's history, its characteristics, characteristics others have assigned, personality and who it has been connected to and who is currently connected to the object.

In one embodiment entry by a registered user enables that user to search and browse through all of the content of the system, by SIO code or by other characteristics of information, following lines of association to other items of information, people, timelines, and more, all associated in the system. In some other embodiments the system is filtered for particular use cases. As one example, collaborative authorship or creation of other items of art may be a specific use case, in which associations to objects and people might be confined to just collaborative novels, to just collaborative poetry, and so on. There may be a configuration interface for a user to invoke filters to just particularly desired subject matter.

Entry into the system was described to some extent above, such as by invoking a search interface in a number of ways. It was described that a user might simply enter an SIO code that is known to that or another user, or might be affixed to an object in some manner. There will be, in alternative embodiments a considerable variety of ways SIO codes might be entered. In some cases one might simply image an object having an affixed SIO code, enter that to the system, and the system will translate the code and connect to the unique object associated with that code. Such a code might be a bar code, a QR code, or a pattern of dots burned into a surface, for example. Once the system associates the entered code to the unique object associated with that unique code, all of the associations of various sorts and strengths are open to the user having entered the code, and the user may then ascertain all sorts of information, such as history of the object and people associated with the object.

A tree may be instantiated as an object by a registered user. The tree may then be cut down, milled, and turned into other objects which may in turn by instantiated in the system of the invention. Other objects may be, for example, furniture, which items of furniture may be associated with the original tree object, with the person who cut down the tree, with the lumber mill that milled the tree into useful planks and such like. A filter in place may limit access to associations that begin with the felling of the tree, or may go back further to when the tree was planted, for example.

A building as an object may be instantiated with an SIO code as well as other objects and people in or associated with the building and a neighborhood or borough, city county, or state where the building may be known to reside. A user may find the history of the building, what businesses were started there, who started them, when they started, what objects were used and who used them.

A ship in a mothball fleet may be instantiated, along with items in the ship, and objects like a flotilla or geography including the ship. The ship may eventually be scrapped and portions of the ship may be made into cell phone cases, which may be associated back to the ship.

A book may be instantiated—read by my father—then by my mother—and so on. Through search a user might discover who has read THAT book, history of those persons, people who have read similar books, and other associations of various strength may be followed. Associations may be made to similar books by genre.

Geographic locations may be instantiated with information entered and associated as to what people have been at this location, what history may have occurred at a location, and more.

An occasion, a happenstance may be instantiated and assigned an SIO code.
For example, a person proposes to her sweetheart at a particular location. That occasion is associated with other people and other occasions that are linked by intersection with the occasion.

A celestial object like a planet or a star, or indeed a galaxy, may be instantiated, and information may be entered of many different sorts, such as relative placement in the universe relative to other celestial objects, as well as age, prognosis for super nova, brightness, and much more.

Items of pottery may be instantiated and associated with artisan, other artisans, type, art genre, availability, age, and much more. Other sorts of artwork, such as paintings, may be instantiated with association to a great deal of information, such a water-color or oil painting, brushes used, similarity to works of other artist, people who have seen a painting, emotional reactions by persons to a painting, and so on.

An instantiated relic from the French Revolution might connect people to the history and the people who fought there as well as everywhere that relic has been and who has connected with it, and also with the many stories of the revolution.

A particular seat at a sporting event might be instantiated with an SIO code on the seat. Associations may be made to actions that seat has witnessed. A home run may have landed there. Someone has had season tickets in that seat and many people have sat there over time.

Groups of people, like the Rolling Stones as a band may be instantiated, and quite rich associations may be made to performers, persons in audience at various times, type of music, music history and repertoire, and so on.

Figure 4:
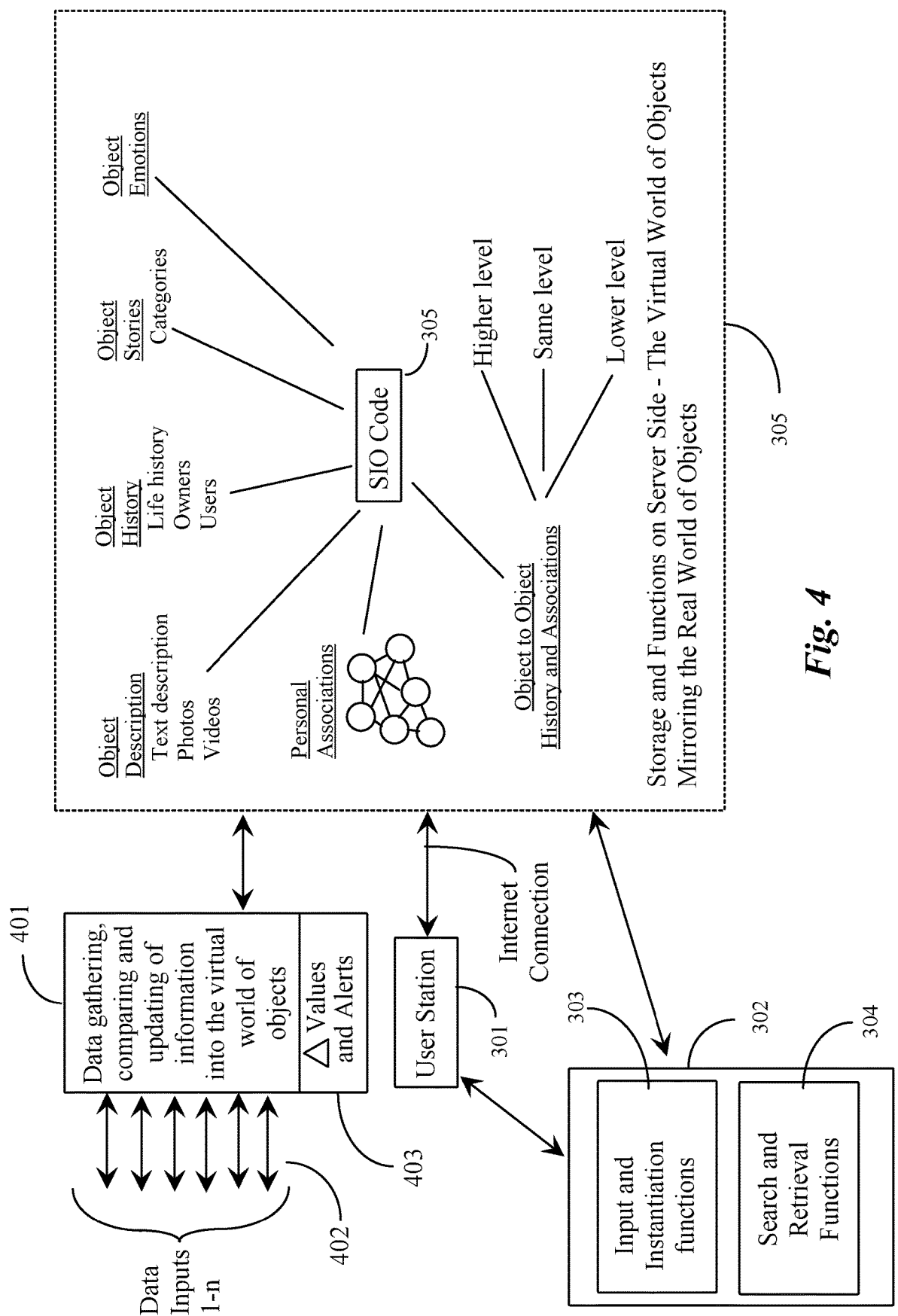
FIG. 4 is a diagram illustrating architecture and functionality in yet another embodiment of the invention.

FIG. 4 is a diagram illustrating architecture and functionality in yet another embodiment of the invention. FIG. 4 is similar to FIG. 3 in that the service 305 of the invention is illustrated, but labeled as a Virtual World of Objects Mirroring the Real World of Objects. It is true that many objects instantiated and associated with an SIO code in the virtual world may be insubstantial and objects in only a broad sense of the word. For example, it is permissible for members of the service to enter and instantiate objects that me be purely imaginary, like Superhero characters. A substantial subset of the virtual world of objects instantiated by members are virtual entities mirroring real-world entities. A member, as one small example, may enter and instantiate an automobile as an object in the virtual world; not a fantasy automobile, but an automobile owned by the member and driven on a daily basis. In such a circumstance the automobile in the virtual world, associated with an SIO code, becomes a virtual associate of the object in the real world.

In the circumstance just described regarding virtual objects and their association to real objects, the virtual objects are data points in a database, associated with stored information that in many cases is entered by the original member that instantiated the object, and that may have a great deal of associated information added by other members. The real objects in the real world have space and time reality that the counterpoint virtual objects do not have.

System 401 illustrated in FIG. 4 is a system comprising hardware, one or more memory elements, and one or processors executing coded instructions. The hardware includes a plurality of input feeds 402 labeled 1-$n$, and a data connection to the virtual world. Input feeds 1-$n$ may be drawing information from a variety of sources, such as a Global Positioning System (GPS) Device in an automobile that may have been instantiated into the virtual world. At the time of instantiating the automobile the member doing so may have access to selections enabling tracking of the automobile. That is, the member may be presented by the system with a configuration interface wherein the member may identify a GPS device (the one in the car).

With GPS enabled for the car that is instantiated, system 401 will look for signals from the GPS through one of feeds 402, and finding same will update information associated in the virtual world with the virtual object mirroring the car, so that real-time position (space and time) for the virtual car may match real time position of the actual car. The virtual world car now has time and position of the real world car.

The car example provided just above is but one small example of the sorts of information that may be anonymously collected by system 401 and stored into the database defining the virtual world. System 401 may monitor news releases and broadcasts, and parse such for references to objects that have counterparts in the virtual world. This collected intelligence may be added to and associated with the counterpart objects.

Another part of system 401 is subsystem 403, which provides delta values and alerts. In the example of the car above, as GPS is tracked for the car, new time and position information may be developed, and reports may be made to the owner of the car that the car has moved twelve miles SSE, for example, in a time delta of 30 minutes. Members may be able to configure their own profiles and system functions to provide alerts in certain cases. In this manner circumstances in the virtual world may be kept relatively close to circumstances in the real world.

Figure 5:
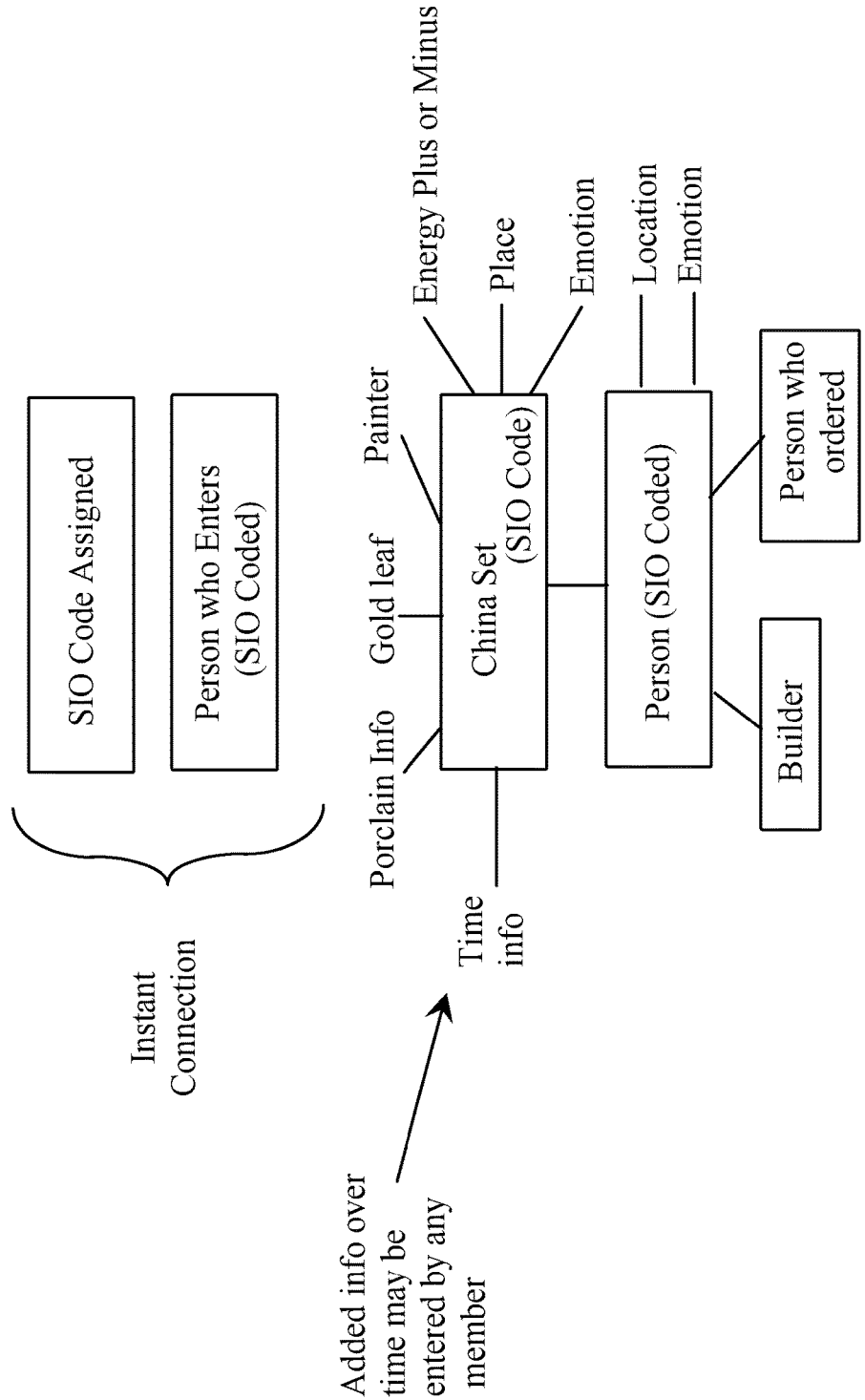
FIG. 5 is a diagram similar to that of FIG. 4 as more specific example of instantiation in an embodiment of the invention.

FIG. 5 is a diagram similar to FIG. 4A showing how adding a new SIO code might work as related to grandma's china, as a more specific example of instantiation of an object and association of the object with other objects and people in a more specific situation. FIG. 5 illustrates how one SIO coded object relates to another to give an idea of how broad is the use of object instantiation. Configuration at time of instantiation and afterward connects the set of china to a person, both of their histories, locations, the parents and person who gave birth to the individual making the china as well as the parent of the person getting the china.

Figure 6:
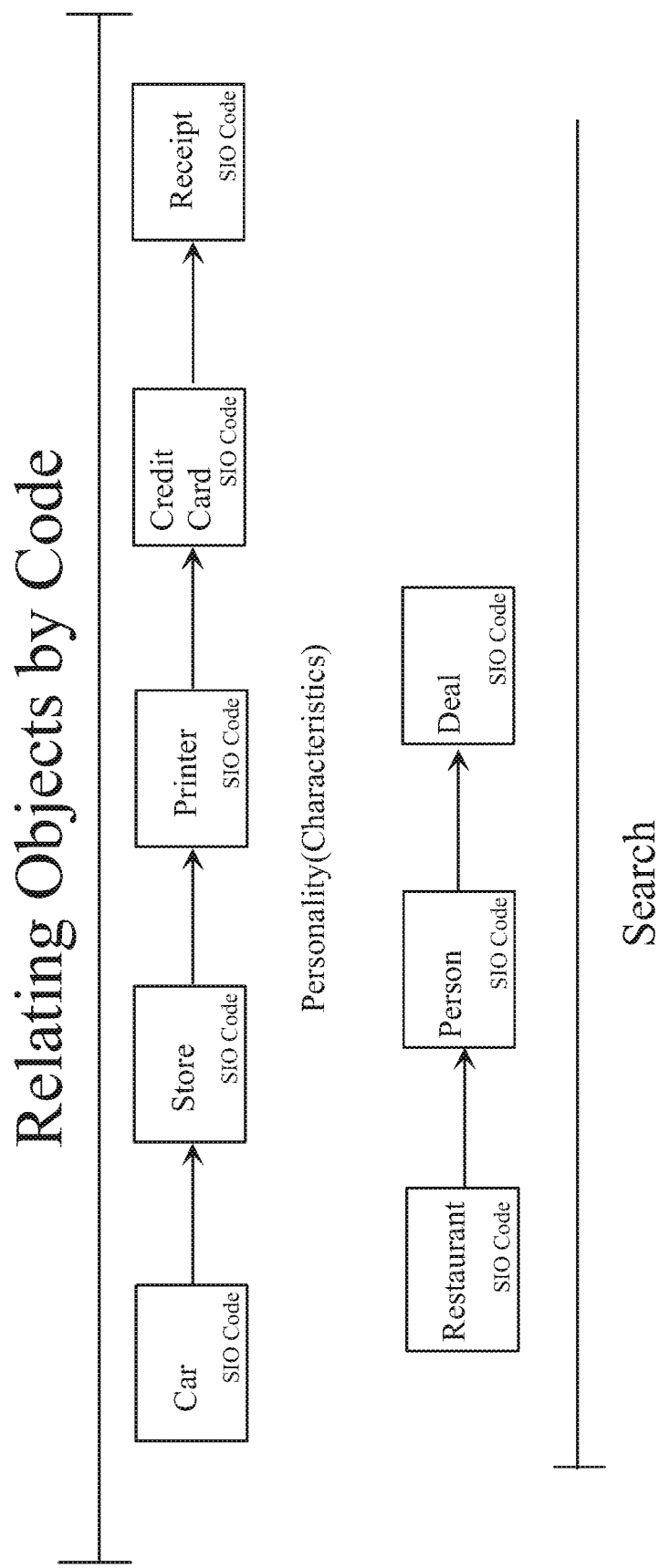
FIGS. 6 and 7 illustrate an example of how the system may tie SIO codes together in a virtual world in an embodiment of the invention.
Figure 7:
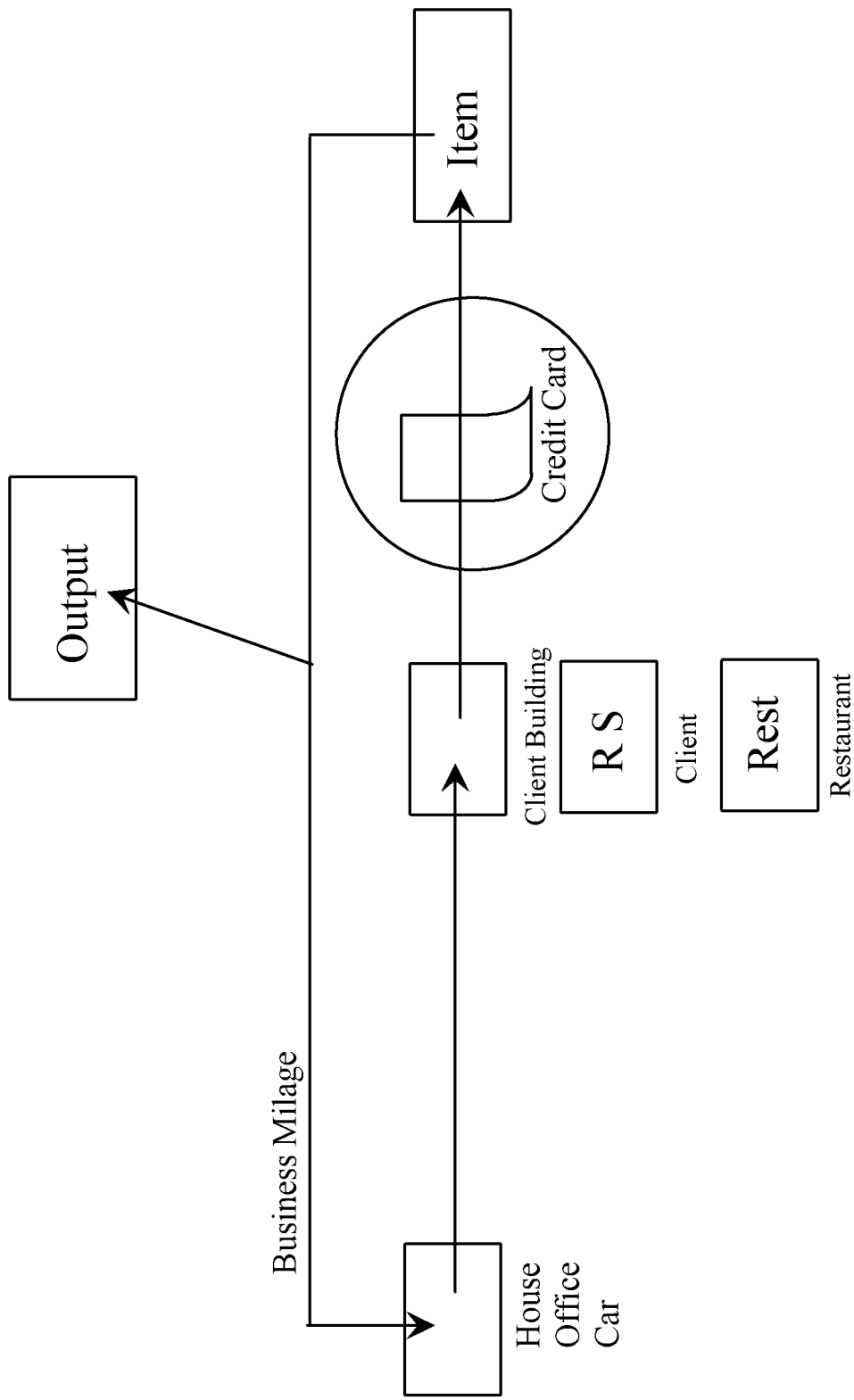

FIGS. 6 and 7 illustrate an example of how the system may tie SIO codes together in the virtual world. The idea of an individual car, a store, an item in the store, a credit card, and a receipt all having SIO codes in the real world, when brought together create a relativity that may be recreated in the virtual world to make automatic direct associations that can be used to fulfill a requirement by other systems in the real world. This example shows how all that information of where a car was located, who was in it, when it left, how far it went, to what location, what the person purchased, the credit card they used, a copy of the receipt and their return drive can be reproduced in the virtual world to interface that data with an accounting software package in the real world to automatically input business transaction and mileage. Ability to determine and associate SIOs in both the real world and our virtual world also enables making available predictive analysis and real time searches. The diagram shows such searches and predictive analysis:

What restaurants in an area are used for business deals?
Is a store more of a consumer store or business?
What are the average distance people will drive to purchase a printer?
What is the carbon footprint of purchasing a printer versus having it sent to you?

Figure 8:
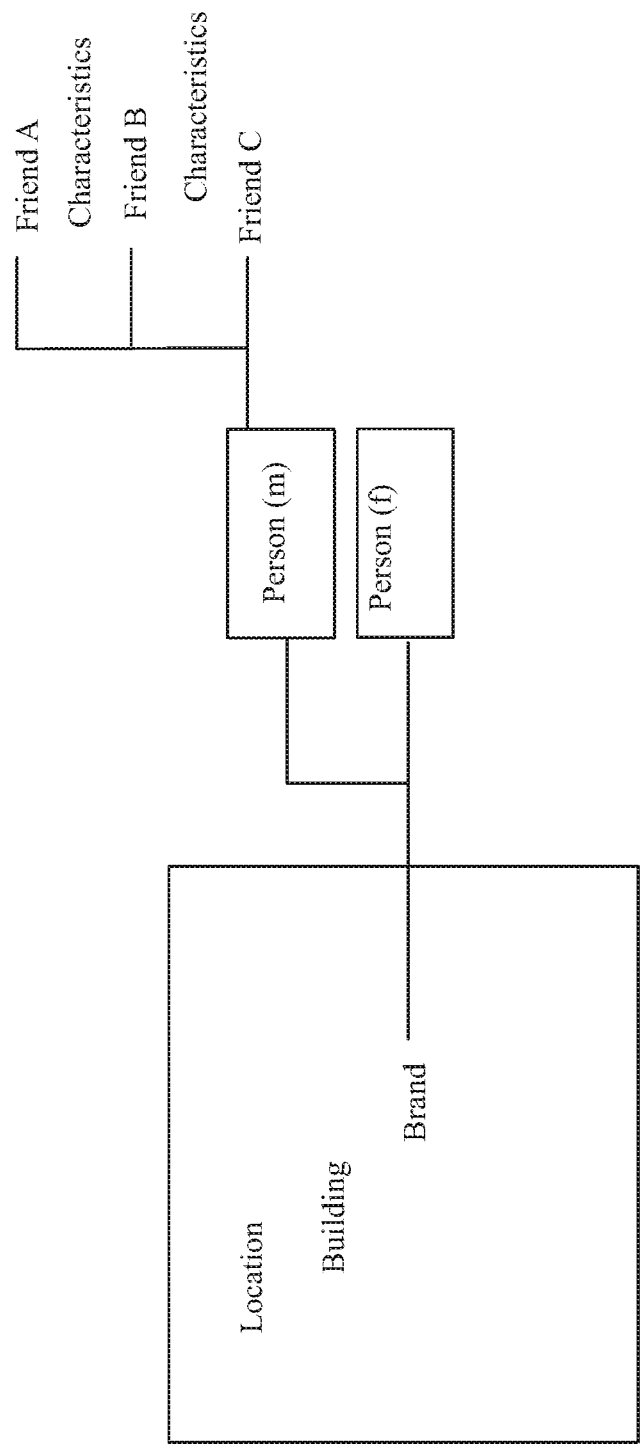
FIG. 8 is a drawing showing a potential hierarchical system of SIOs in both the real world and a virtual world in an embodiment of the invention.

FIG. 8 is a drawing showing a potential hierarchical system of the SIOs in both the real world and virtual world. In this model, the Location data table represents the "parent" part of the hierarchy, while the Building represents the "child" part of the hierarchy. To move farther down the control system, the Building data table represents the "new parent" part of the hierarchy, while the Business 1's SOI located in the building, Business 2 SOI's located in the building, represents the "child" part of the hierarchy. And it continues creating parent—child relationships as more relationships are made to the SOI's. In contrast to typical tree structures, in this model each SIO can be a child or a parent at the same time to different SIOs.

Figure 9:
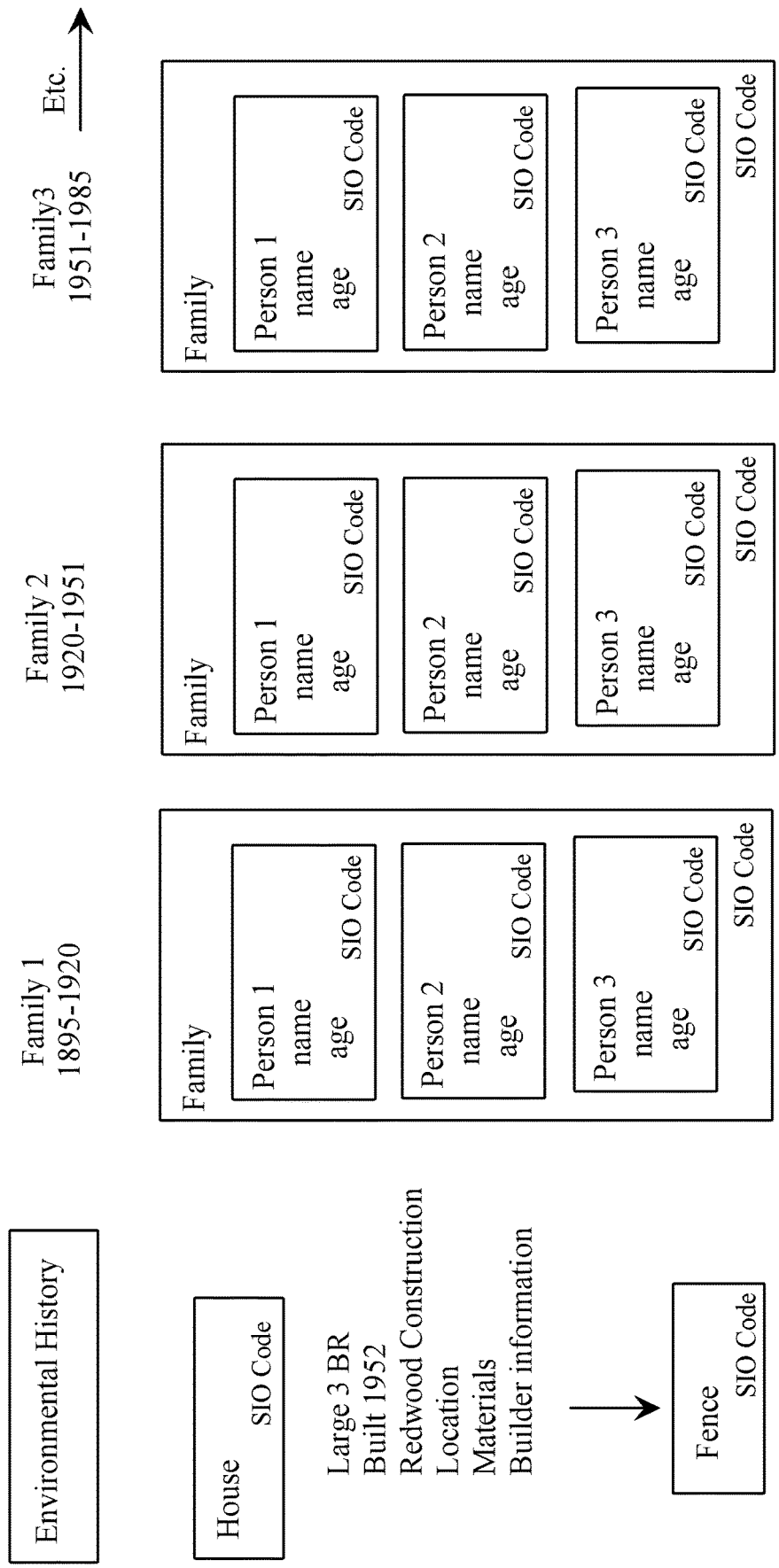
FIG. 9 illustrates how the system in an embodiment of the invention can potentially tie SIO codes of different families living in a specific home over a period of time.

FIG. 9 is an example of how the system can potentially tie SIO codes of different families living in a specific home over a period of time. The ability to follow the history of a home, when it was built, the people that lived in the home and where each of these people are now is not available today, but it can be available in the virtual world. Even the items that were and are in the house can be instantiated, assigned SIO codes, associated hierarchically with a wealth of information, and be tracked and found or verified if needed.

Figure 10:
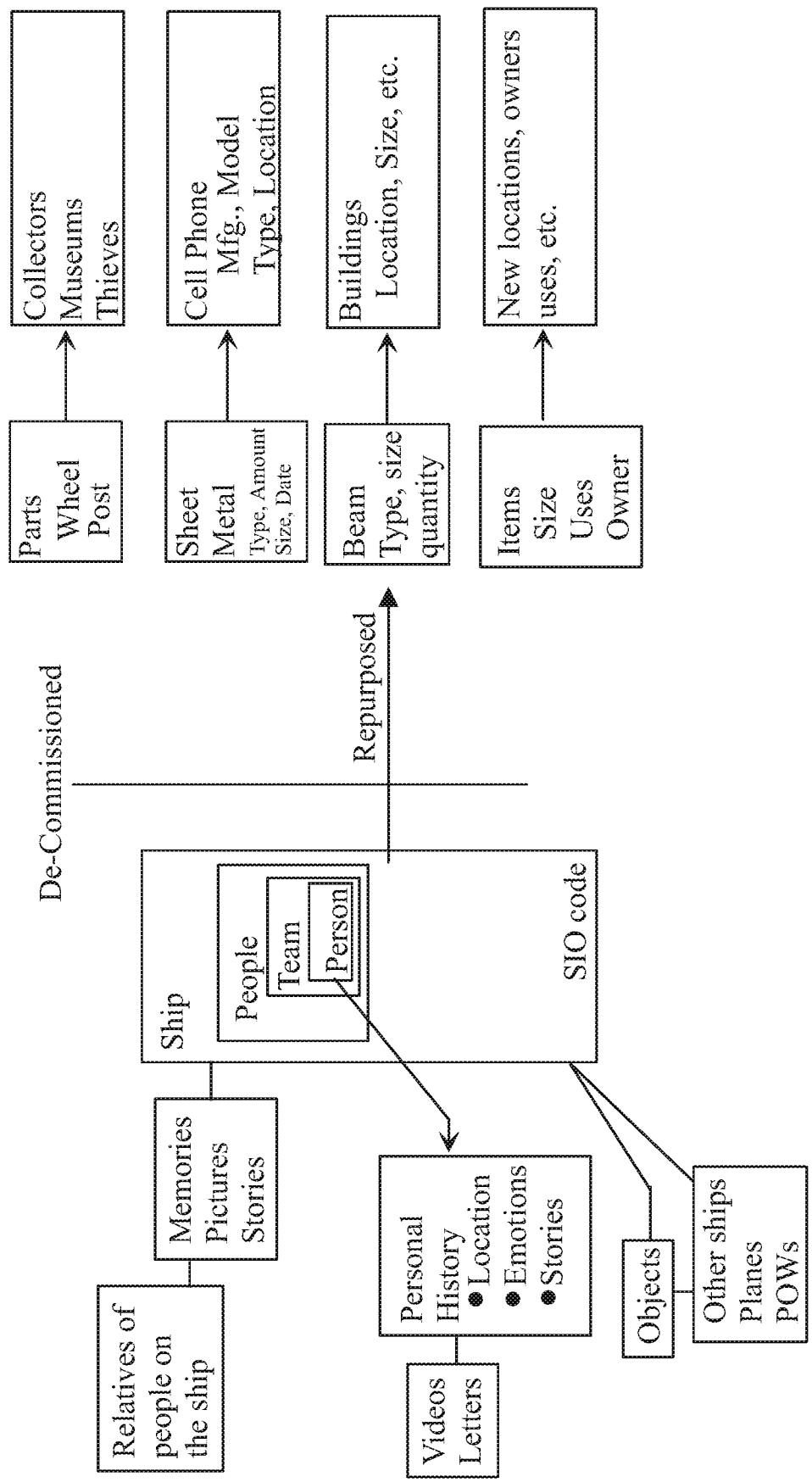
FIG. 10 is a diagram of a complex object having an SIO code showing how one SIO code can resolve into many SIO codes.

FIG. 10 is a diagram of a complex object having an SIO code and how one SIO code can transition into many SIO codes. The example illustrates a ship that was built in the 1950's. The diagram shows how the ship, the people in the ship, the parts of the ship can all have SIO codes and histories. In this example after the ship is put out of commission, each of the parts can be issued a separate SIP code and these can be tracked. If the ship was dismantled the parts can be repurposed and used to make different items. Each type of item if it were to go to different manufactures could be tracked as it is made into parts, sheet metal, iron beams, and blocks of steel. If it was then used to make cell phones, went to a collector's museum, used to make a skyscraper, or melted to make a gun—the entire history of all the SOI could be tracked at different time in their history.

Who was on the ship?
When was the ship built?
What battles was the ship involved in?
My cell phone carries the metal used in the 1950 Destroyer that survived all attacks that Robert Harris was on.

In another important aspect of the invention a very sophisticated statistical ability is provided whereby the nature of objects, associations of persons with objects and objects with objects, including thoughts and emotions entered by persons about objects, and personal characteristics and profiles of persons with objects are tracked relative to time, and periodic snapshots of segments of the database may be made, and analyzed in a wide variety of ways, with statistical representations of such snapshots made available, either publically or in a restricted manner. Segment definition may be made in real time in a search facility, and any one or more of a wide variety of algorithms may be called to provide statistical output relative to one or more segments. The algorithms available for statistical analysis may be created in real time (on-the-fly) as well.

As perhaps a rather simple example, a member may be authorized by the system to seek statistical output by defining a segment as all instantiated objects that are commercial cruise ships over a particular tonnage and belonging to any of three commercial cruise lines, and analyze information in the system as to, for example, how many persons of a particular ethnic origin and above a threshold income level booked passage on these cruise liners in a particular two-week time window of the previous calendar year.

As another simple example, the segment may be limited to a single painting hanging in the New York Metropolitan Museum of Art, for which persons who are associated in the database with this painting have entered emotional reactions to this painting at various times. The query in this example may be to track how emotional reaction to this painting may have changed over a prescribed period of time over the totality of people associated with the painting and who have entered such opinion, and how reaction may have changed depending upon one or more of age, ethnicity, gender, height weight, hair color, or any other characteristic of such persons that may be available in personal profiles of the persons in the system. Characteristics of course may be combined in different ways in different interrogatories in such analysis.

The skilled artisan will recognize that such statistical ability combined with search criteria, segmentation criteria, and the great deal of information and variety of associations in the system provides a very valuable tool for personal, private and commercial analysis, that may be leveraged in many ways by an enterprise hosting such a system.

In some embodiments of the invention, related to statistical tracking and reporting, information associated with one object may be automatically associated with one or more other objects as well. This function enables a member, for example, to enter information about or for a specific object, which information may be then associated with all objects that share a particular characteristic with the specific object.

In one aspect of the invention it is important to understand, as described in different places above, that an "object" in the concept of the Social Identity of Objects as described in many aspects in this specification, is not limited to objects having physical reality. Any identifiable entity that may be expressed as a noun in language may be an instantiated object in this SIO concept. There is no general agreement, for example, that religious figures have physical reality, although many believe that they do in many cases. So, as a very broad definition, if you can imagine it and name it, it may be instantiated as an object with an SIO code in the SIO database. Many such objects may have mostly verbal or textual descriptions associated in the SIO dB, but may also be linked to art works, sketches or pictures, for example, provided by the instantiating member or others, according to each person's understanding of the nature of the object, whether real or imaginary, regardless of opinions as to whether an instantiated object is real or imaginary. Again, any entity that may be imagined and named, for which a description may be provided, may be instantiated in the SIO system and assigned a unique SIO code, and that object may be associated in a number of ways with the person who initiates the instantiation.

One very important instance of object instantiation has to do with the Internet network and the vastly interconnected instances of information sites, termed nodes or websites, each of which typically has been assigned an IP address and a URL comprising a domain name, that uses that IP address to connect interested people in the Internet network to individual ones of such nodes. It is well known in the art that persons operating Internet-capable appliances may execute browsing applications, like Google for example, and may connect to such information sites by asserting a URL, or in some cases an IP address directly, and may use interactive interfaces presented by the browser program in interaction with website, to access information and activities and services provided by the website, including further navigation to pages in the site and other sites. This, of course, is how the SIO system works as well.

In one embodiment of the instant invention a person may, through procedures described above, instantiate a website in the Internet as an object in the SIO system, assigning a unique SIO code to the site that is different from the IP address or URL of the site. The instantiating person may enter description of the site, which may include the IP address and the URL, or multiple URLs associated with the site, and any other description that may be associated with each such site in manner as described above.

The description above regarding websites may be extended to nodes in the Internet of Things as well, with different nodes in the IoT being instantiated as objects in the SIO system, each with a unique SIO code, such that such network objects may be related to people and other objects in the SIO system in the many ways described above.

In one embodiment of the invention the population of Internet sites instantiated in the SIO system by SIO code may be accessed through the SIO system by asserting the SIO code, which automatically in this embodiment asserts the URL and/or IP address. In various embodiments of the invention the SIO system may crawl the population of Internet sites in the SIO system, and may cache sites by various criteria, including textual, audio and image content, and search and browse functions may be provided in very specialized ways to facilitate enhanced search functions for members of the SIO system.

The skilled artisan will understand that the descriptions made above, some with reference to particular figures and elements in figures, are all exemplary of the architecture and functions that may be provided in embodiments of the invention. There are many other objects and sorts of objects that may be instantiated in the invention, and many functions in entry, search browsing, editing information, and such like that will fall within the spirit and scope of the invention.

The Social Identity of Objects is comprised of an object's continual positioning in time and space, it's appearance, relationships with other objects and the interactions with or effects on human and non-human entities.

The software that executes on the Internet-connected server that enables instantiation of objects is termed Socrates by the inventors. The software in various aspects of functionality also enables instantiation of SIO data for each object in the system, and recommends data based on time, place, space, written tags, photos, videos, descriptions, commonality, and emotions to be displayed through an interface, among other functions described elsewhere in this specification.

The SIO code is attached to or associated with each object, whether it be physical or metaphysical and is used to reference the object when new data associated to the object is received or communicated.

In the system no two objects are exactly the same. From the time they are instantiated they are, by nature, their own individual object and have their own specific set of attributes. Much of this differentiation is caused by human, planning, design or interactions, but some can be created in the virtual world as well. This model of creating social identities for objects may have a significant impact in quests for understanding and exploring virtual reality and artificial intelligence as well as enrich existence for persons interacting with the system, and the objects in the system and counterparts in the real world.

The skilled person will understand that there may be many focused applications and use cases to which aspects and features of the present invention, in various embodiments may be applied. One such use case may be application to museums, art galleries, and other managed, curated and/or natural collections of objects.

SIO in a Museum or Collectibles Application

In application to a museum the SIO system may have a dedicated database with many of the attributes described above. Notably every person acting in an agent capacity for the museum, sometimes termed, for example, curators, will be assigned a unique SIO number, as will every person registered with the museum and enabled to upload digital files, such as photos, videos, audio files, PowerPoint files, PDF figures, figures in vector drawing programs, and essentially any known sort of digital file, to add to the evolution of a social identity for individual ones of objects instantiated as museum objects.

In the broader aspects of the SIO system as described above, any registered person might be enabled to instantiate an object, to which an SIO code may be associated. In the more narrow aspects of the SIO system as applied to a museum or other finite collection of objects, the museum objects may be chosen and displayed in the museum by agents of the museum, and agents of the museum may instantiate the SIO objects associated one to one with the many physical and virtual museum objects.

As museum objects are instantiated in the database by agents of the museum, individually or in batches, each is associated with a unique SIO code, and that SIO code is associated with the SIO code of the agent who instantiates. Further, objects that are not museum objects on display in the museum, but that may be related to such objects may also be instantiated, and cross-associated with the museum objects and the agents, As the museum database matures, members of the public and of other enterprises, as well as of other museums, may be enabled to build on the overall stored social identity of individual ones of the museum objects by uploading descriptions, stories, experiences, pictures, videos, and many other digital files in all known media formats, each assigned a unique SIO code as the file is added, and associated both with the user adding the descriptive material and the museum objects.

Once in active use, the SIO system dedicated to the museum may have a substantial plurality of SIO objects associated with the physical museum objects, and these may be categorized in different hierarchical collections. Users may interact with objects by viewing, uploading memories, digital images or videos, or any other type of text or digital media, through their own, or publicly available, digital devices, in print, through kiosk type displays, or in person at the museum. The collections of information in widely disparate digital files, as the social identity of the objects to which the information is associated by SIO codes, may be viewed and otherwise digested, that is, experienced, and the evolution of the social identity of individual objects, adds meaning and social value to the museum objects.

How it works:

A Curator, or moderator, (an agent) of the museum uploads an image or other recognizable representation of an object in the museum, or objects, people or events, related to the museum. These instantiations may be singular or in batches.

The museum object is assigned an SIO code, and so is the image representing the object.

The SIO code of the image exists in a hierarchical way with the subject and is connected by attributes in common—similar tags—with other object SIO's in the system.

Visitors may attach their own images, stories, other SIO codes to SIO codes related to objects in the museum Users outside of the museum can add memories, images and other content to the object's SIO codes By its very nature the objects in the museum connect users of the system with many layers of objects, humans, places and events related to the objects in the museum and the museum itself.

The information provided by the users give the museum curators and owners of the objects in the museum visibility into the popularity, significance, history and provenance of the objects in the museum, or related to objects in the museum over periods of time.

By adding media, comments, experiences and stories to the SIO codes of the objects, the user will be forever connected to the object, the museum and the objects related to the object and the museum.

In one example of how SIO Codes may work in a museum, an individual or groups of visitors may take a photo in front of the museum or an object in the museum. That photo would be related to the object and the person in the photo. By assigning an SIO code to the image and knowing that it is related to the person in the image and the object in the image, a collage or mosaic that represents the main object in the image and is comprised of the combination of two or more images taken by two or more people would be rendered and given a unique SIO code related to each of the humans and other SIO codes related to the humans and other objects in the system.

In one example, the objects with SIO Codes and their Social Identities can be presented in different mediums such as a kiosk, controlled monitor or Television or other ways to display and interact with the objects whether connected to the internet or not.

In one example SIO Codes incorporated in such a way to create interactive learning and/or gamification.

In one example there is an ability to take a physical item's SIO code and its attributes into the virtual world. Physical objects using their attributes and those like them to interpret and react to events and human activities occurring in the physical world through gaming. Placing the Physical Object in the Virtual World giving the Virtual Worlds Object chosen attributes to be used in different Virtual Worlds giving them selected use of those attributes. An example would be a famous soccer players cleats used in the World Cup Soccer game that was able to score an amazing number of goals or a method to the goal and allowing those to be associated with a particular virtual player for a specific given amount of time.

Furthermore in this example, the memories associated with the cleat in the real world can effect and change what the cleat does in the virtual world and the actions in the virtual world will impact the identity of the object in the physical world in the present and over time as the data related to the experiences grows and evolves over time.

It is possible for virtual objects to be instantiated higher up the hierarchy and to have representations in the physical world be lower and point to the original object, in this case a virtual object.

In one instance the SIO Code is used to access the data stored within the SIO network. By accessing the network through the code, users can transfer ownership of or give access to the use of the SIO code to another user in the system or authorize the continued storage of the historical information related to the object.

One example is an ability for the museum to identify SIO's and what SIO's are of interest to create a linear flow through the museum exhibits so (objects that are less seen but of importance) that the museum would place these Objects strategically based on the persons passions or interests in the flow to get more interest and/or value.

Another use case is an ability for the museum to add objects that are not physically in the museum, but are given permission by the objects owners to be in the collection virtually. This allows visitors to the museum to experience rich content and the social identities of objects related to but not in the museum. This could extend beyond physical objects to things such as movie clips, songs, visual and audio media related to the subjects associated to the museum.

The museum might also produce replicas and prints related to objects in the museum. Each replica or print would be lower hierarchically than the original object, and would represent a child (Replica or print) of the parent (Original) by being individually instantiated, and connected to the parent and the rest of the children by association.

Another interesting layer of the SIO network in the museum space is an ability of the system and the museum's moderators to visualize the reactions by visitors to particular objects based on their demographic data combined with the reactions they have had to other objects in the system compared to the way others have interacted to similar objects. For example, visitors from China may have similar reactions to religious objects, whereas natives from Puerto Rico may commonly use words like, "Saint", "Hero", "Primero", when referring to an athlete like, for example, Roberto Clemente. Women, children or people from different locations may use different, but similar words and have differing, but similar reactions as others like them. The system may also track the difference of opinions and vernacular over time.

Users of the system will naturally have emotional reactions to physical objects, people, places or events. The system can gather these emotions and synthesize the combination of emotions in such a way that the end user can experience the emotions associated with the object through sound, light, color or descriptive text, or other modalities.

The museum and the objects also share these emotions among each other in a hierarchical manner. For example the emotions associated with all objects in the museum will be associated with the SIO code of the museum itself.

One SIO attribute that will continue to be surfaced is the notion of prominence and popularity of objects. By their nature, objects in museums are interesting to people and have a level of significance. The more that visitors virtually or physically interact with the objects, the more they will increase in significance. This is especially the case when a person of significance interacts with the object in the SIO Network.

By their very nature, objects in museums are significant. They may hold significance based on the materials they are made from, their rarity, value, their existence in time and space, the events they have "witnessed" or their relationships to historic or significant people, as well as many other contributing factors. For this purpose and reason, there may be a special or particular SIO code, input field or an internal ranking system that identifies or gives these objects, people, places or things, more significance within the system and in the real or virtual worlds.

An object can also be associated with, shared or transferred principles or standards of behavior; rules, value-monetary and/or sentimental, rarity, beliefs, emotions, ideals, ideas, culture and any number of other values or behaviors attached to itself and shared with other objects in the SIO system and in the real and virtual worlds.

Physical representations of SIO codes will allow visitors to easily access data related to individual objects in the museum. This can include QR codes, bar codes, or a unique sequence of digits that can be entered into a mobile device or scanned. It can also include a unique representation of an SIO sticker or placard optimized for individuality whose purpose is to display and/or allow the user access to view or instantiate objects related to the subject of the physical indicator's social identity. A unique SIO indicator would keep the system closed and more secure while optimizing the ability to create strings of SIO codes in direct relation to the subject, its children and the changing form of the subject over time.

In one implementation the museum may sponsor an Internet connected server executing coded instructions from a non-transitory medium, the coded instructions providing interactive interfaces for both agents of the museum, in the many activities and responsibilities of the agents, and also for registration and activities of other persons as patrons of the museum, who may by registration, be enabled to add material to the social identity of objects of the museum, and to experience the social identity of objects as evolved by the additions of other users.

In one implementation there may be an application that may be installed and executed on a mobile device through which users may interact with the SIO system of the museum. This application may allow anyone with an account to add photos, posts, short videos (21 seconds) to any item in the museum or subject related to the museum that is already in the application. The application will allow account holders to share object input by email, social channels or other digital, virtual or physical mediums to display their memories and/or solicit memories from their friends, family, acquaintances with similar interests. This version of the application may also allow users to begin to create their own individual unique identifiers for subjects or objects in their possession or of interest to the person. This version would allow private storage and display as well as public storage and display of instantiated objects and their attributes.

In some embodiments there may be search functions provided for various purposes. For example, there may be a search function operable for agents of the museum enabling the agents to search the database using a variety of search criteria. For example, an agent may search SIO codes, names of objects, categories of objects, objects by dates of entry, and a rich variety of other search terms, which may enable agents to track and publish evolving social identity of objects and categories of objects.

Users who are not agents of the museum, and who are enabled to upload information to be associated with objects and groups of objects in the museum, are each assigned a unique SIO code, and that unique code is associated in the system with each file that the user may upload. In some embodiments the users that are not agents are registered to the system, and there may be a personal profile, which may comprise at least some contact information. Some such users may elect to have their personal information hidden, and some may elect a more public persona.

In one embodiment coded instructions executing on a server may provide interactive interfaces for users to browse museum objects and to upload media to add to the social identity of museum objects. There may be further functions to afford communication between users, and enablement may be dependent to some extent on common interests, as indicated by on-line behavior and activity of the users.

Tracking and publishing social identity of objects and categories of objects is an important function in the invention, as this ability makes possible many of the expected outcomes, as listed just below:

Expected Outcome
- Objects in the museum would have a public identity
- Objects in the museum would become more valuable
- Objects in the museum would connect people with similar interests
- Objects in the museum would gain wider circulation
- Objects in the museum would be able to be connected to objects, people, places and events outside of the museum The skilled person will understand, again, that the descriptions herein of various embodiments and implementations are entirely exemplary. The scope of the invention is limited only by the claims.

The invention claimed is:

1. A system, comprising:
an enterprise managing a collection of physical objects; and
a digital domain hosted by the enterprise, comprising:
a network-connected data repository storing, as virtual objects, name and description of individual ones of the physical objects in the collection of physical objects, each virtual object associated with a unique SIO code;

a network-connected server coupled to the network-connected data repository, having a processor executing software from a non-transitory medium, the software providing interactive interfaces to authorized persons operating network-connected computerized appliances, each authorized person associated with a unique SIO code;

a plurality of sets of media files, each set associated uniquely with an individual one of the virtual objects in turn associated with an individual one of the physical objects in the collection of physical objects, the media files comprising image, textual and audio information providing history, stories and opinions regarding the associated physical object; and a substantial plurality of virtual objects stored in the network-connected data repository other than the virtual objects representing the physical objects in the collection of physical objects, each one of the substantial plurality of virtual objects associated with a unique set of media files;

wherein associations are created between SIO codes of individual ones of the substantial plurality of virtual objects other than the virtual objects representing the physical objects in the collection of physical objects, and SIO codes of the virtual objects representing the physical objects in the collection of physical objects, and wherein a plurality of persons are enabled to access and view the unique sets of media files associated with virtual objects representing the physical objects in the collection of physical objects, and additionally the unique sets of media files associated with virtual objects other than the virtual objects representing the physical objects in the collection of virtual objects, associated by SIO codes with the virtual objects representing the physical objects in the collection of physical objects, through individual ones of the interactive interfaces, enabling thereby an evolving social identity of each of the physical objects in the collection of physical objects, the evolving social identity supported by a plurality of virtual objects and media files associated with the plurality of virtual objects.

2. The system of claim 1 wherein the plurality of persons enabled to access and view the unique sets of media files are further enabled to submit new media files regarding individual ones of the virtual objects in the data repository, to instantiate new virtual objects with unique SIO codes, and to associate individual ones of the new virtual objects by SIO codes with individual ones of the virtual objects representing individual ones of the physical objects in the collection of physical objects, and representatives of the enterprise are enabled to select submitted media files to be added and new virtual objects to be added and associated with the virtual objects representing the physical objects in the collection of physical objects.

3. The system of claim 2 wherein the representatives of the enterprise are enabled to remove physical objects in the collection of physical objects, to add new physical objects in the collection of physical objects, to instantiate new virtual objects for the new physical objects, to upload new sets of media files associated with the new virtual objects, and to associate the new virtual objects by SIO codes with existing virtual objects.

4. The system of claim 1 wherein one of the interactive interfaces provides a search function enabling authorized persons to search the database using a variety of search criteria.

5. The system of claim 4 wherein search criteria comprise at least the unique SIO codes associated with the virtual objects, names of objects, descriptions of objects, objects by dates of instantiation, and identity of contributors of individual media files.

6. The system of claim 1 wherein the enterprise is a museum, and the objects in the collection of objects are displays in the museum.

7. The system of claim 1 wherein the enterprise is an art gallery, and the objects in the collection of objects are artistic works displayed in the art gallery.

8. A method, comprising:

setting up by a representative of an enterprise a collection of physical objects;

creating a digital domain hosted by the enterprise, comprising:

storing in a network-connected data repository, as virtual objects, a name and description of individual ones of the physical objects in the collection of physical objects, each virtual object associated with a unique SIO code;

storing in the network-connected data repository unique sets of media files, each set associated uniquely with an individual one of the virtual objects in turn associated with an individual one of the physical objects in the collection of physical objects, the media files comprising image, textual and audio information providing history, stories and opinions regarding the associated physical objects;

storing in the network-connected data repository a substantial plurality of virtual objects other than the virtual objects representing the physical objects in the collection of physical objects;

storing in the network-connected data repository unique sets of media files comprising image, textual and audio information providing history, stories and opinions, each set associated uniquely with an individual one of the virtual objects other than the virtual objects representing the physical objects in the collection of physical objects;

associating individual ones of the substantial plurality of virtual objects other than the virtual objects representing the unique physical objects in the collection of physical objects by SIO code with individual ones of the virtual objects representing the unique physical objects in the collection of physical objects; and coupling a network-connected server to the network-connected data repository, the server having a processor executing software from a non-transitory medium, the software providing interactive interfaces to authorized persons operating network-connected computerized appliances, each authorized person associated with a unique SIO code, enabling a plurality of persons to access and view the unique sets of media files enabling thereby an evolving social identity of each of the unique physical objects in the collection of physical objects, the evolving social identity supported by a plurality of virtual objects and media files associated with the plurality of virtual objects.

9. The method of claim 8 further comprising enabling the plurality of persons enabled to access and view the unique sets of media files to submit media files regarding individual ones of the virtual objects associated uniquely with an individual one of the virtual objects in turn associated with an individual one of the unique physical objects in the collection of physical objects, and to submit media files regarding individual ones of the virtual objects other than the virtual objects representing the unique physical objects in the collection of physical objects, wherein representatives of the enterprise select submitted media files to be added to individual ones of the sets of media files.

10. The method of claim 9 comprising the representatives of the enterprise removing physical objects in the collection of physical objects, adding new physical objects, instantiating new virtual objects for the new physical objects, and uploading new sets of media files associated with the new virtual objects.

11. The method of claim 8 further comprising searching the data repository by the plurality of persons using a search function providing a variety of search criteria.

12. The method of claim 11 comprising searching by the unique SIO codes associated with the virtual objects, by names of objects, by descriptions of objects, by objects by dates of instantiation, and by identity of contributors of individual media files.

* * * * *